US008274892B2

(12) United States Patent
Chiang et al.

(10) Patent No.: US 8,274,892 B2
(45) Date of Patent: Sep. 25, 2012

(54) UNIVERSAL DIGITAL FRAMER ARCHITECTURE FOR TRANSPORT OF CLIENT SIGNALS OF ANY CLIENT PAYLOAD AND FORMAT TYPE

(75) Inventors: Ting-Kuang Chiang, Saratoga, CA (US); Drew D. Perkins, Saratoga, CA (US); Edward E. Sprague, Woodside, CA (US); Daniel P. Murphy, Ben Lomond, CA (US)

(73) Assignee: Infinera Corporation, Sunnyvale, CA (US)

( * ) Notice: Subject to any disclaimer, the term of this patent is extended or adjusted under 35 U.S.C. 154(b) by 527 days.

(21) Appl. No.: 11/154,455

(22) Filed: Jun. 16, 2005

(65) Prior Publication Data

US 2005/0286521 A1 Dec. 29, 2005

Related U.S. Application Data

(63) Continuation-in-part of application No. 10/715,947, filed on Nov. 18, 2003, now Pat. No. 7,286,487, which is a continuation-in-part of application No. 10/267,212, filed on Oct. 8, 2002, now Pat. No. 7,295,783.

(60) Provisional application No. 60/580,240, filed on Jun. 16, 2004, provisional application No. 60/427,159, filed on Nov. 18, 2002, provisional application No. 60/392,494, filed on Jun. 28, 2002, provisional application No. 60/328,332, filed on Oct. 9, 2001, provisional application No. 60/370,345, filed on Apr. 5, 2002, provisional application No. 60/367,595, filed on Mar. 25, 2005, provisional application No. 60/378,010, filed on May 10, 2002.

(51) Int. Cl.
*H04L 12/26* (2006.01)

(52) U.S. Cl. ........ 370/235

(58) Field of Classification Search ........ 370/389, 370/216–235, 241, 249, 252–253, 351, 392, 370/395.1, 395.5, 395.51–395.53, 464, 465–467, 370/469–472, 476, 498, 537–539, 901–903, 370/907

See application file for complete search history.

(56) References Cited

U.S. PATENT DOCUMENTS 5,040,170 A 8/1991 Up et al.

(Continued)

FOREIGN PATENT DOCUMENTS

EP 1229692 A1 * 8/2002

OTHER PUBLICATIONS

"G.709—The Optical Transport Network (OTN)", 15 Pages, Feb. 2002 (Downloaded from the web site of Acterna.com).

(Continued)

*Primary Examiner* — Anh-Vu H Ly
*Assistant Examiner* — Omar Ghowrwal
(74) *Attorney, Agent, or Firm* — W. Douglas Carothers, Jr.; Ross M. Carothers; David L. Soltz

(57) ABSTRACT

A transmission network includes network elements which accept client signals to be transported over a transmission network, particularly an optical transmission network, each of the client signals having one of a plurality of payload rates. The client signals are digitally mapped into first transport frames and, subsequently, digitally mapped into second transport frames for transport across the network infrastructure. The second transport frames having a universal frame rate throughout the transmission network infrastructure supporting a client signal of any frequency, whether the client signal includes a standard client payload or a proprietary client payload.

22 Claims, 18 Drawing Sheets

U.S. PATENT DOCUMENTS

| | | | | |
|---|---|---|---|---|
| 5,757,871 | A | 5/1998 | Furukawa et al. | |
| 6,014,708 | A | 1/2000 | Klish | |
| 6,587,470 | B1 * | 7/2003 | Elliot et al. | 370/404 |
| 6,633,584 | B1 * | 10/2003 | Russell et al. | 370/466 |
| 6,717,953 | B1 * | 4/2004 | Heuer et al. | 370/466 |
| 6,744,787 | B1 * | 6/2004 | Schatz et al. | 370/506 |
| 6,765,928 | B1 | 7/2004 | Sethurram et al. | |
| 6,999,470 | B2 | 2/2006 | Murton et al. | |
| 7,099,584 | B1 * | 8/2006 | Narvaez et al. | 398/58 |
| 7,260,099 | B1 * | 8/2007 | Brown et al. | 370/395.51 |
| 7,934,013 | B2 * | 4/2011 | Rutherford et al. | 709/233 |
| 2001/0021171 | A1 * | 9/2001 | Notani | 370/222 |
| 2001/0022826 | A1 | 9/2001 | Rude | |
| 2002/0018493 | A1 * | 2/2002 | Robledo et al. | 370/539 |
| 2002/0075980 | A1 | 6/2002 | Tang et al. | |
| 2002/0083190 | A1 | 6/2002 | Kamiya et al. | |
| 2002/0084807 | A1 | 7/2002 | Miyamoto et al. | |
| 2002/0090007 | A1 | 7/2002 | Kamiya et al. | |
| 2002/0138685 | A1 | 9/2002 | Jones, Jr. | |
| 2002/0154659 | A1 | 10/2002 | Singh et al. | |
| 2002/0167337 | A1 | 11/2002 | Chelcea et al. | |
| 2002/0172227 | A1 | 11/2002 | Varelas et al. | |
| 2002/0196791 | A1 * | 12/2002 | McNeil et al. | 370/401 |
| 2003/0012188 | A1 * | 1/2003 | Zelig et al. | 370/389 |
| 2003/0048813 | A1 | 3/2003 | Lahav et al. | |
| 2003/0063018 | A1 * | 4/2003 | Warren et al. | 341/68 |
| 2003/0081596 | A1 | 5/2003 | Kididis et al. | |
| 2003/0099018 | A1 | 5/2003 | Singh et al. | |
| 2003/0120799 | A1 * | 6/2003 | Lahav et al. | 709/236 |
| 2003/0123493 | A1 | 7/2003 | Takahashi | |
| 2003/0154301 | A1 * | 8/2003 | McEachern et al. | 709/237 |
| 2003/0223469 | A1 * | 12/2003 | Deng | 370/542 |
| 2004/0033004 | A1 | 2/2004 | Welch et al. | |
| 2004/0042462 | A1 * | 3/2004 | O'Neill et al. | 370/395.5 |
| 2004/0042474 | A1 * | 3/2004 | Walker et al. | 370/412 |
| 2005/0117585 | A1 | 6/2005 | Linkewitsch et al. | |
| 2005/0185961 | A1 * | 8/2005 | Bhalla et al. | 398/75 |

OTHER PUBLICATIONS

M. Fuller, "Ecosystem-On-A-Chip"—Product Profile, Lightwave, p. 24, Jan. 2004.

R. Ramaswami et al., "Optical Networks—A Practical Perspective", pp. 265-266, 2002 Morgan Kaufmann Publishers.

P. Richardson et al., "G.709 and the Optical Transport Network (OTN) Interface", pp. 1-4, Apr. 2003.

* cited by examiner

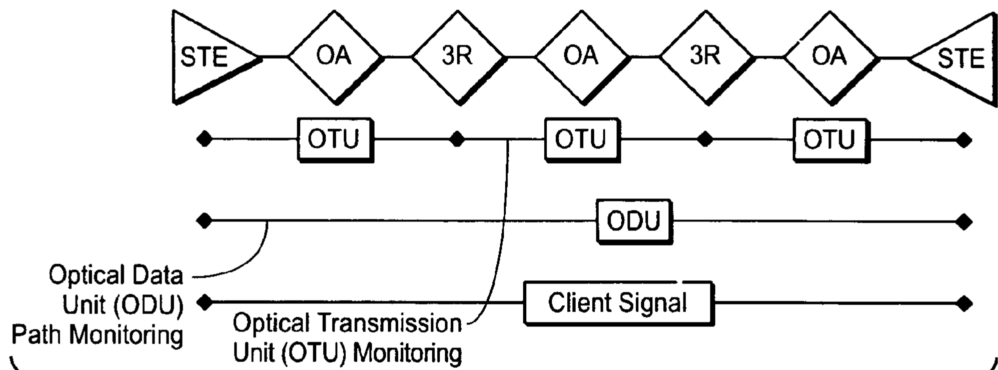
FIG._1
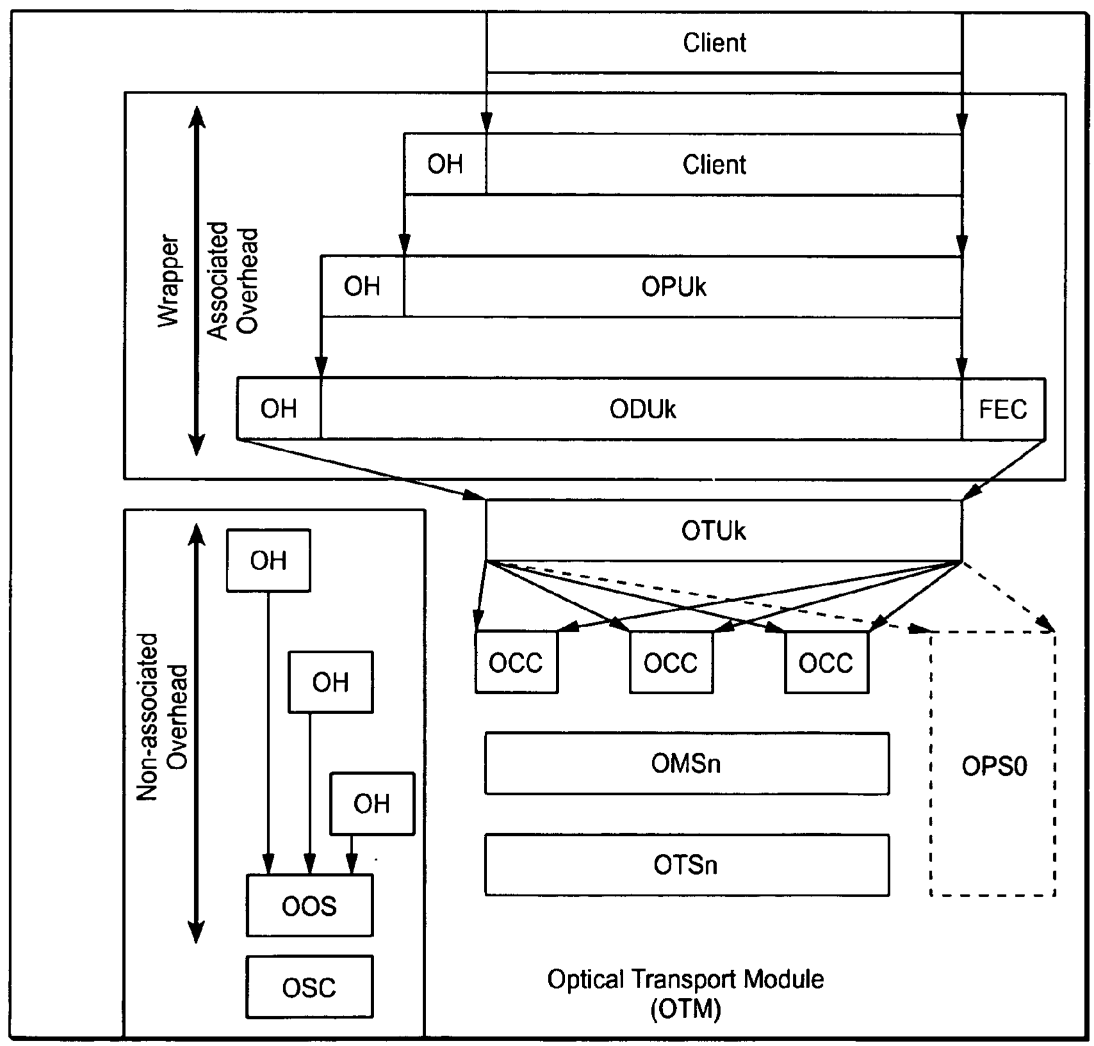
FIG._2

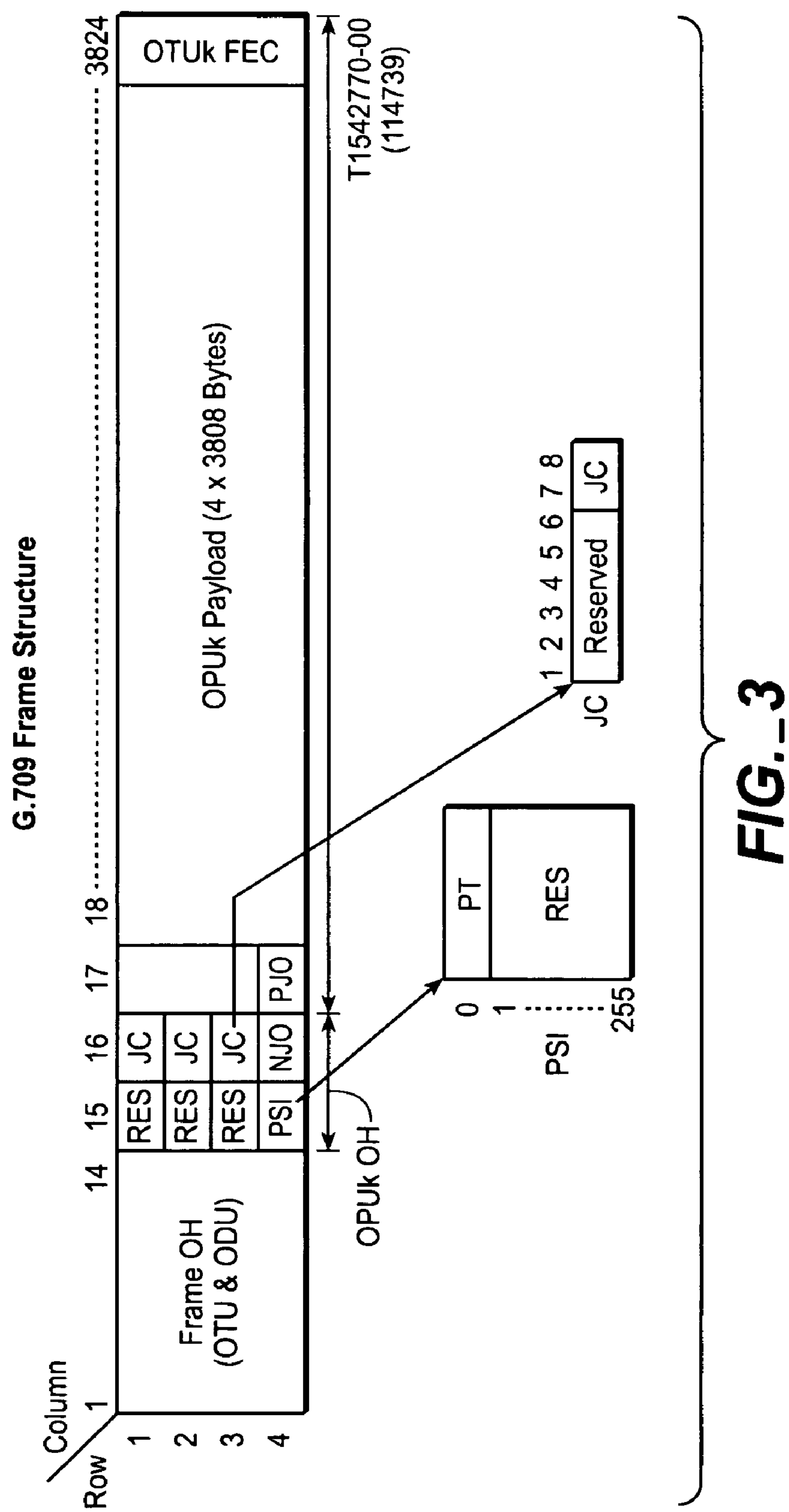
FIG._3

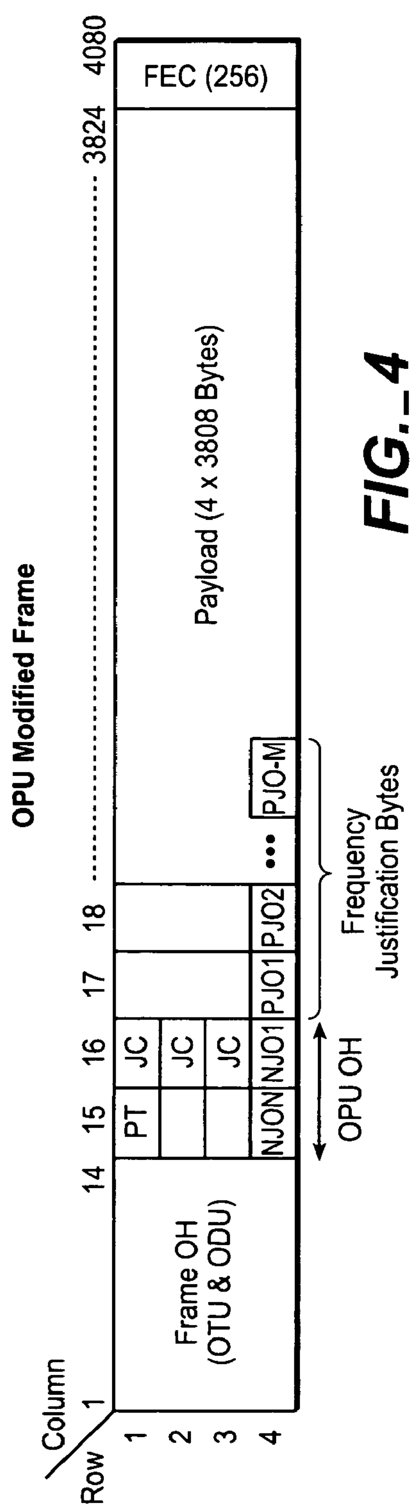
FIG._4
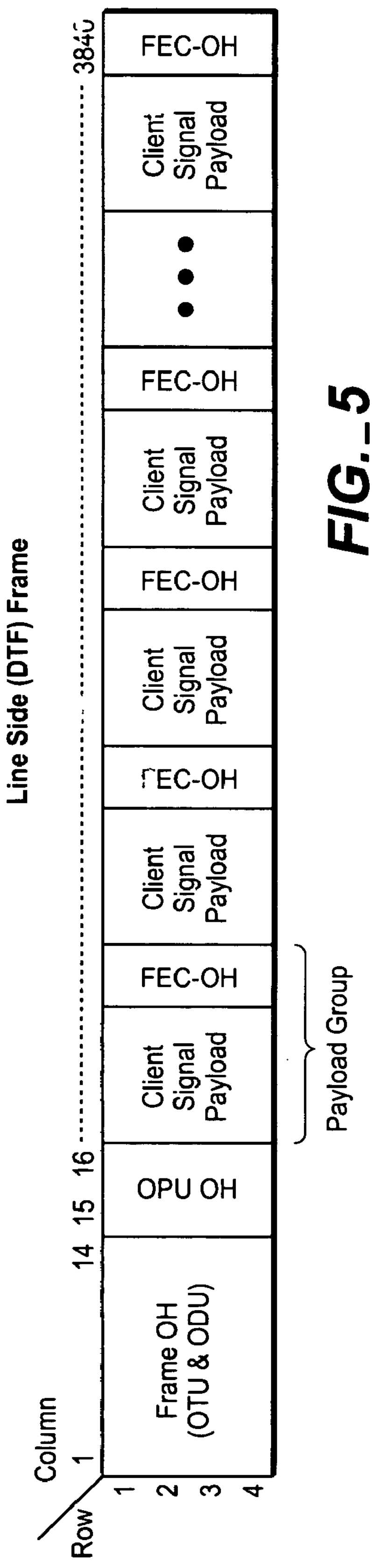
FIG._5

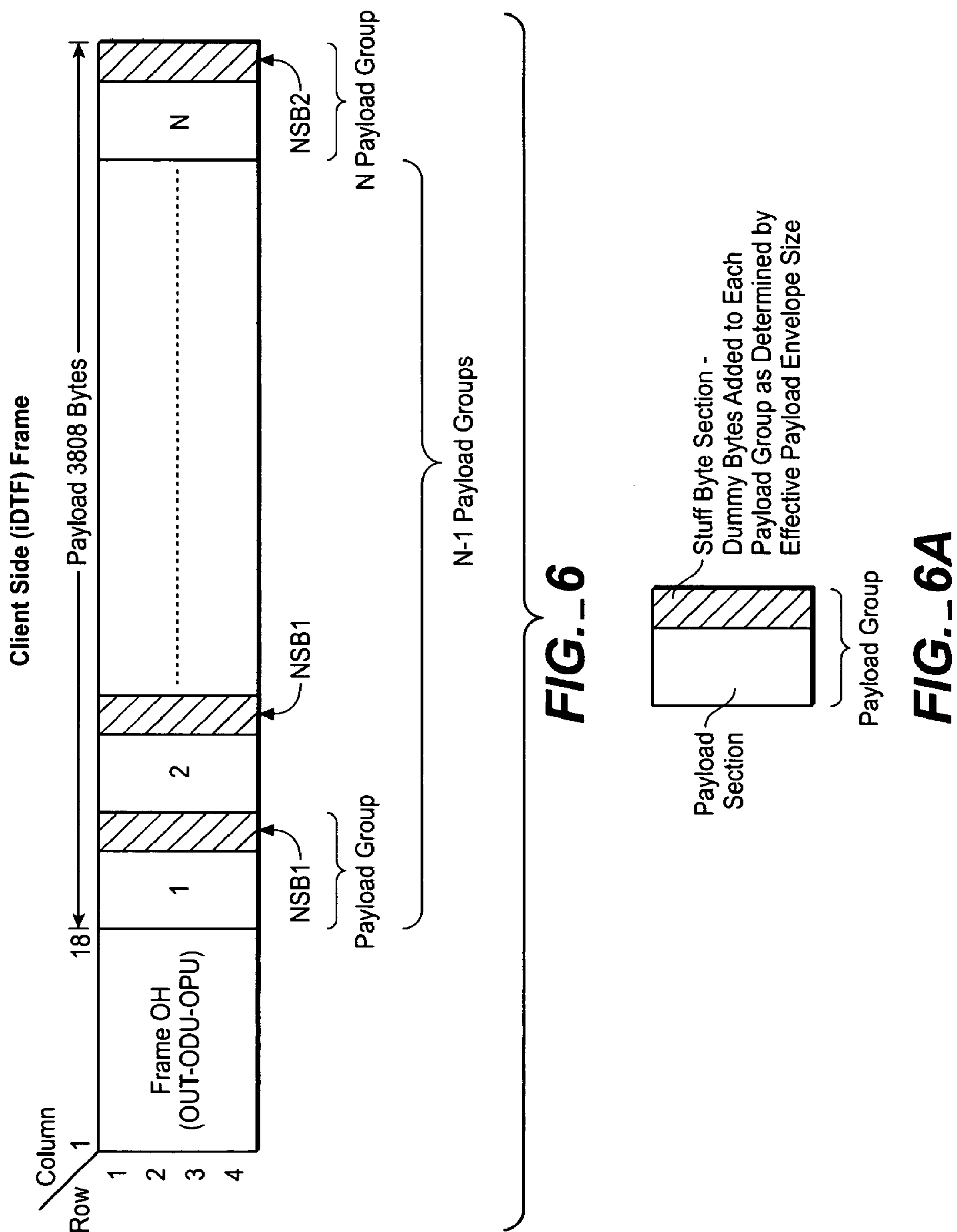
FIG._6
FIG._6A

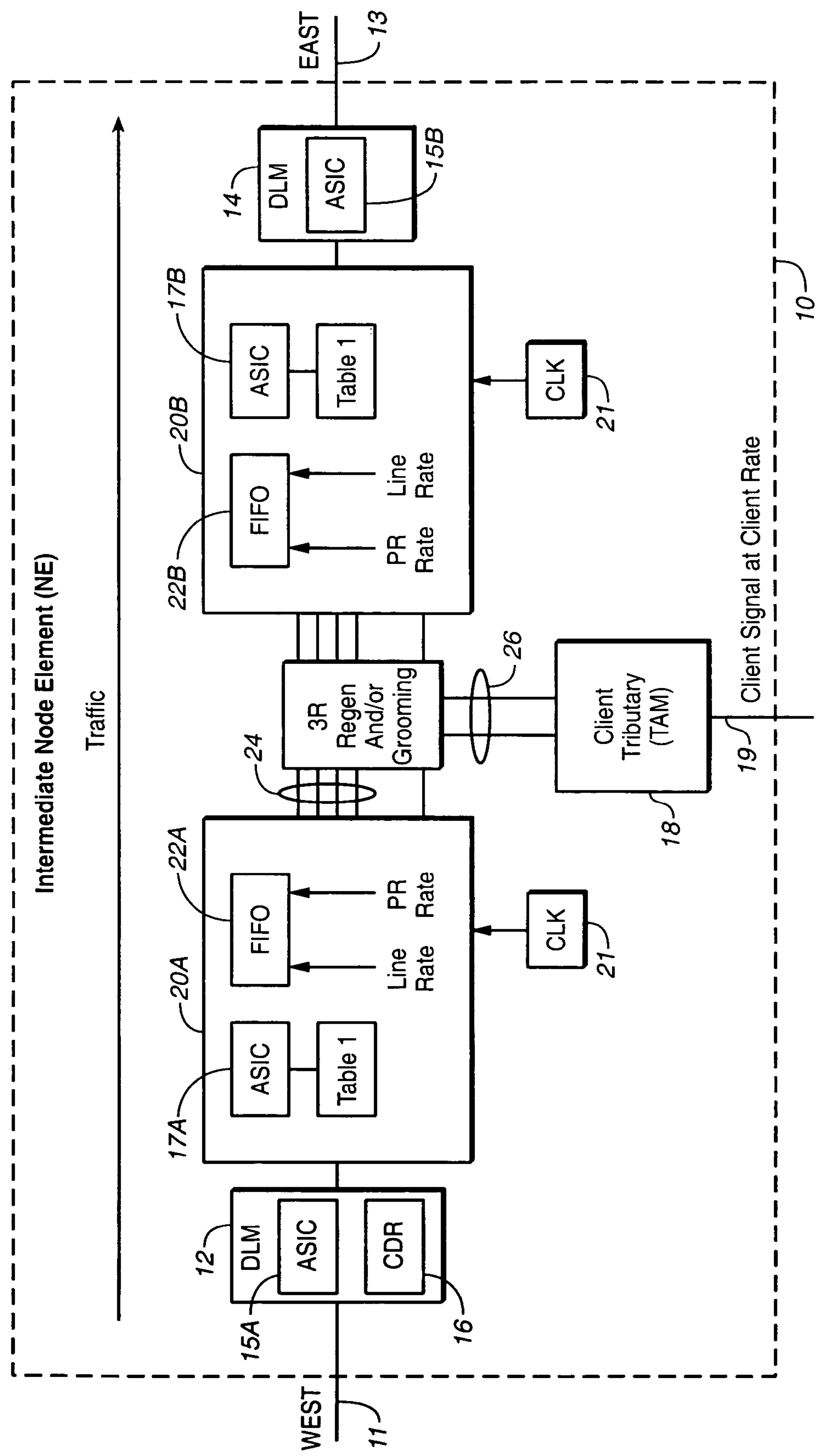
FIG._7

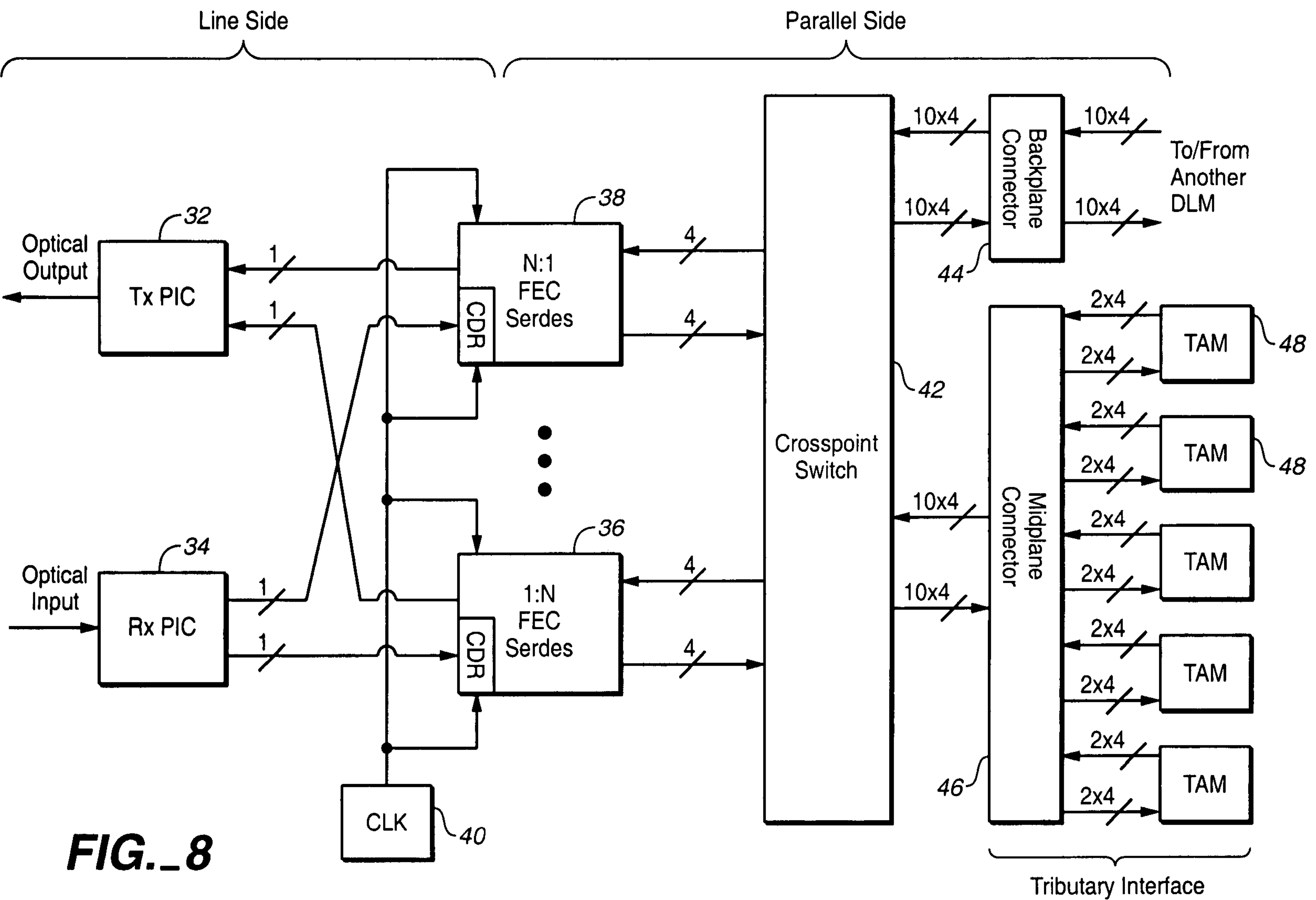
FIG._8

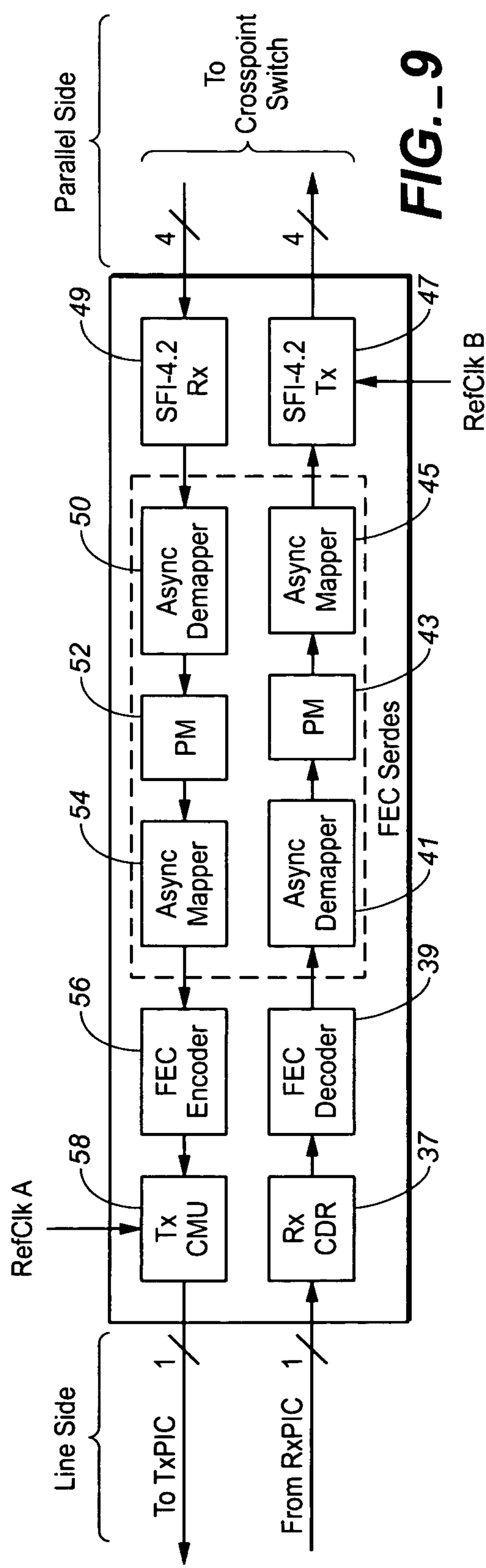
FIG._9
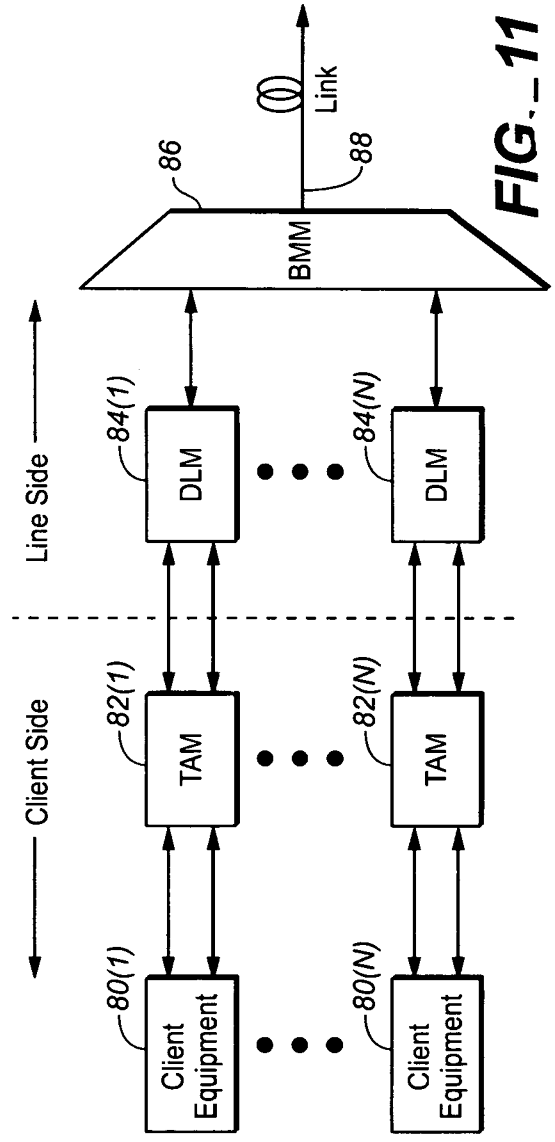
FIG._11

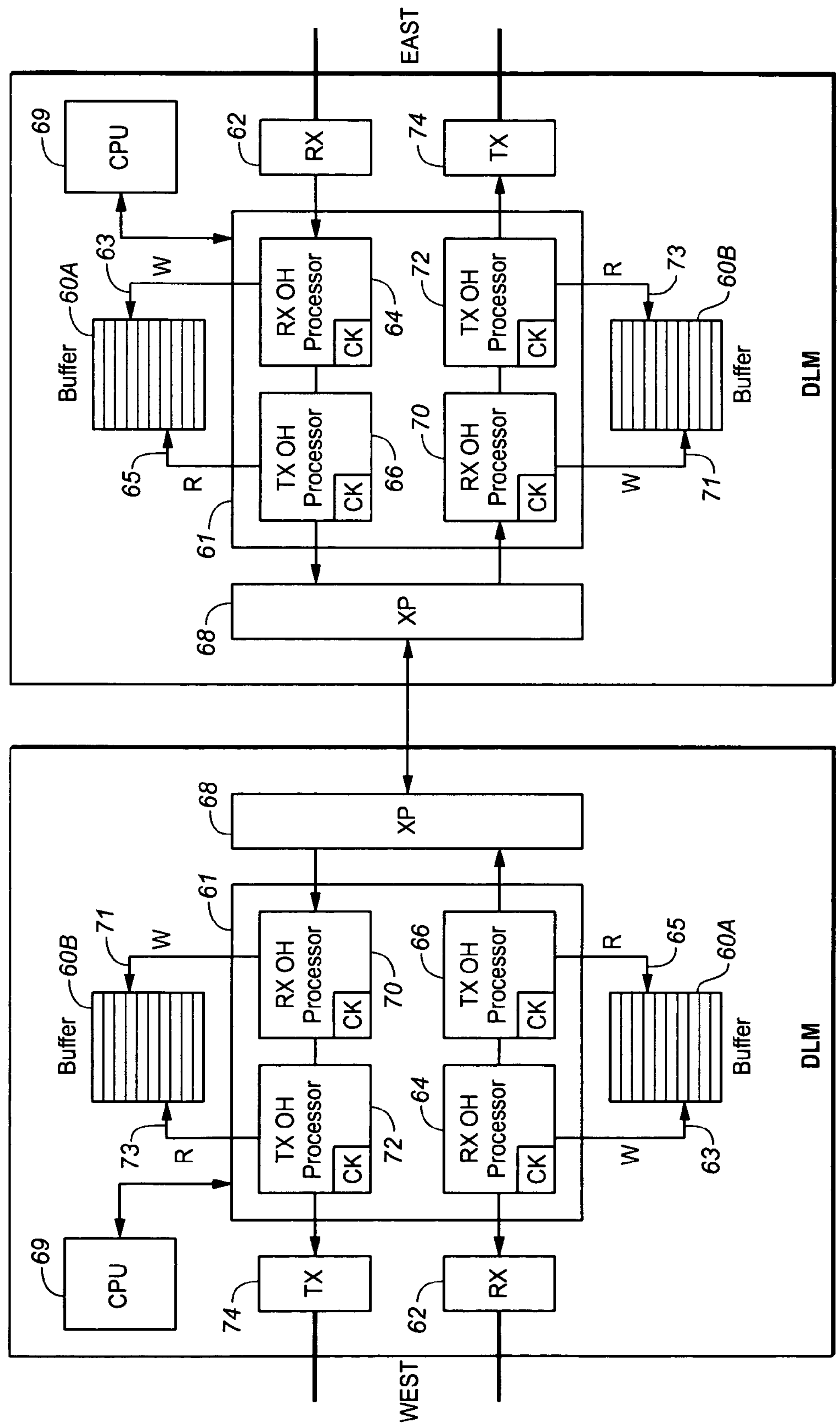
FIG._10

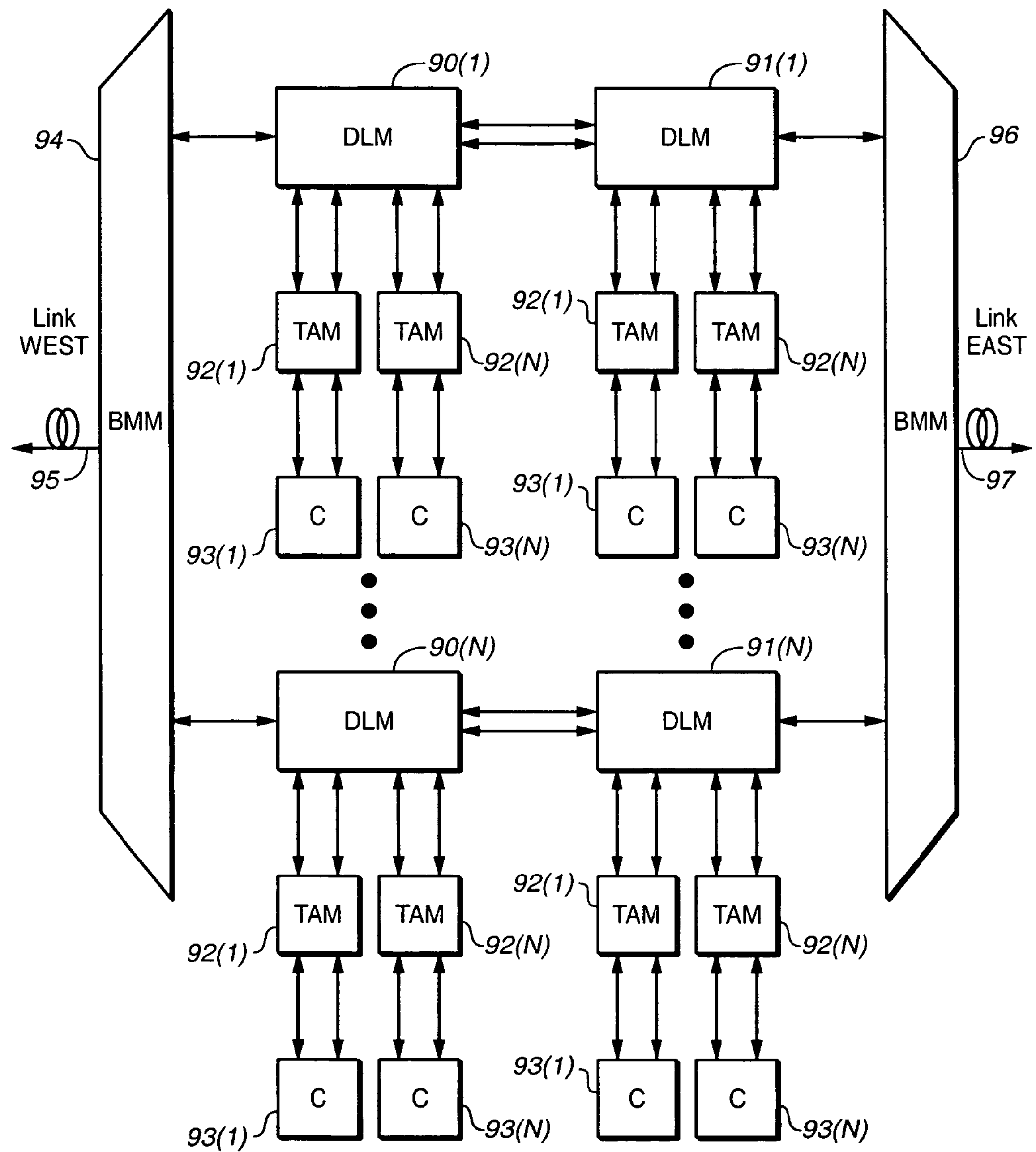
FIG._12

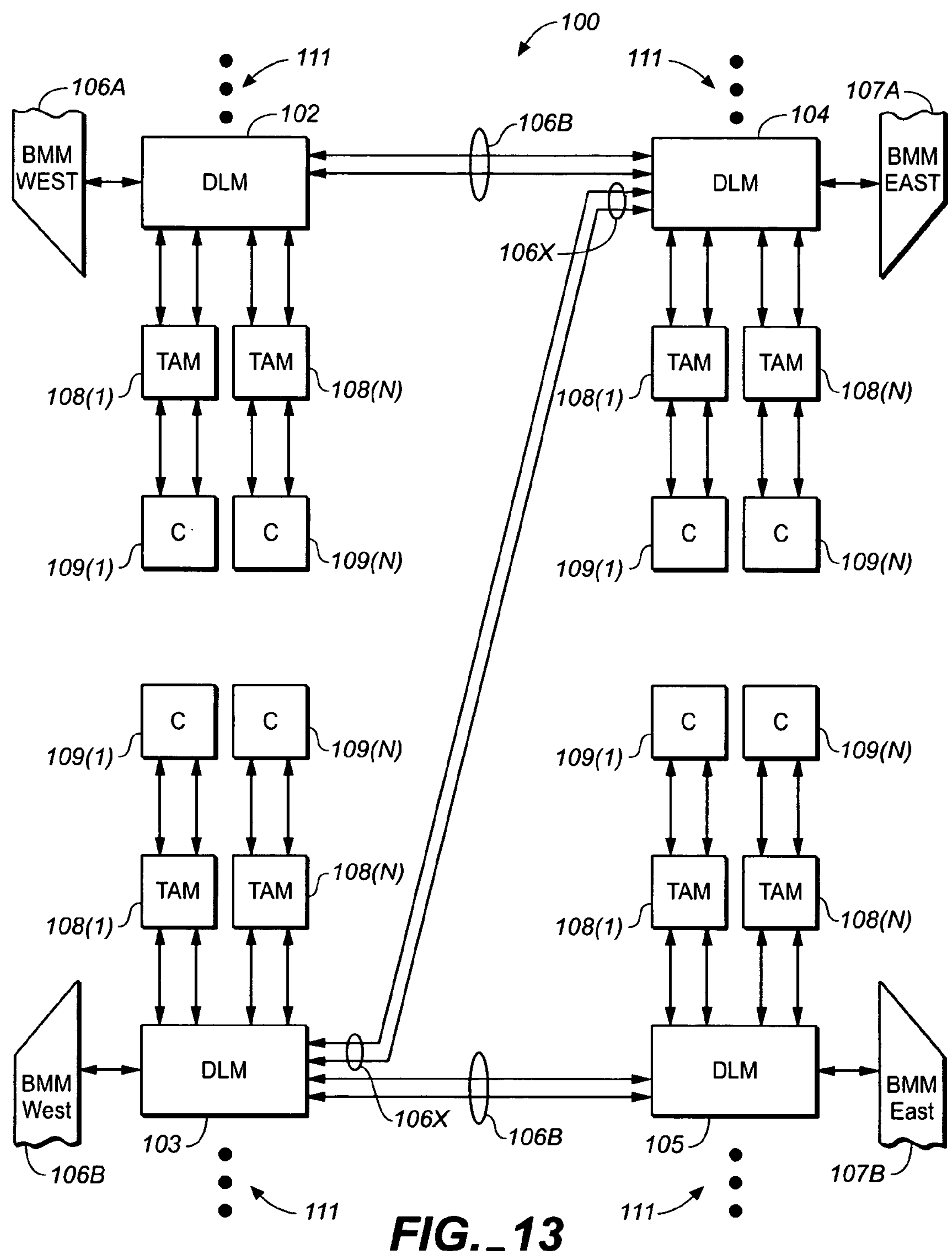
FIG._13

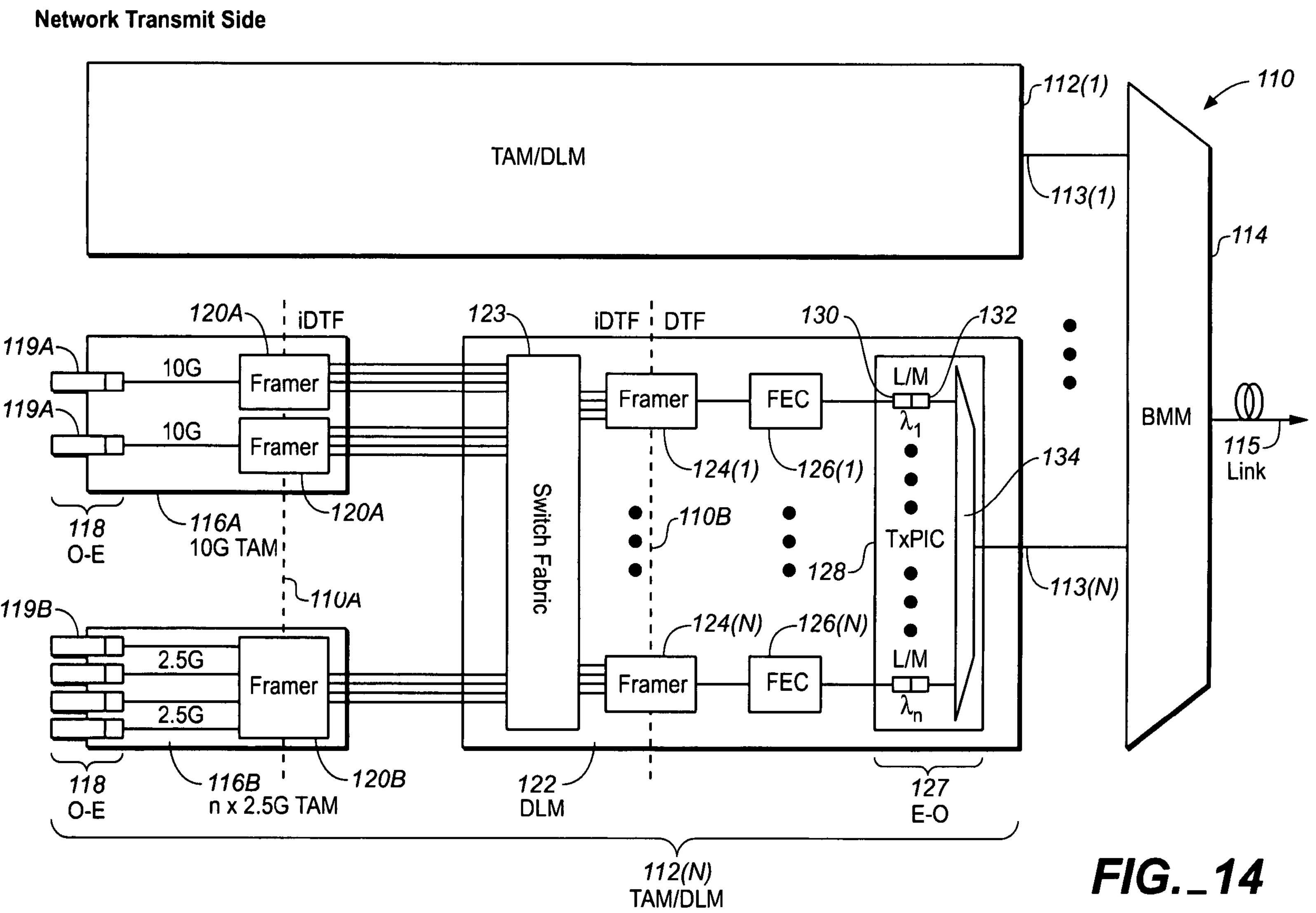
FIG._14

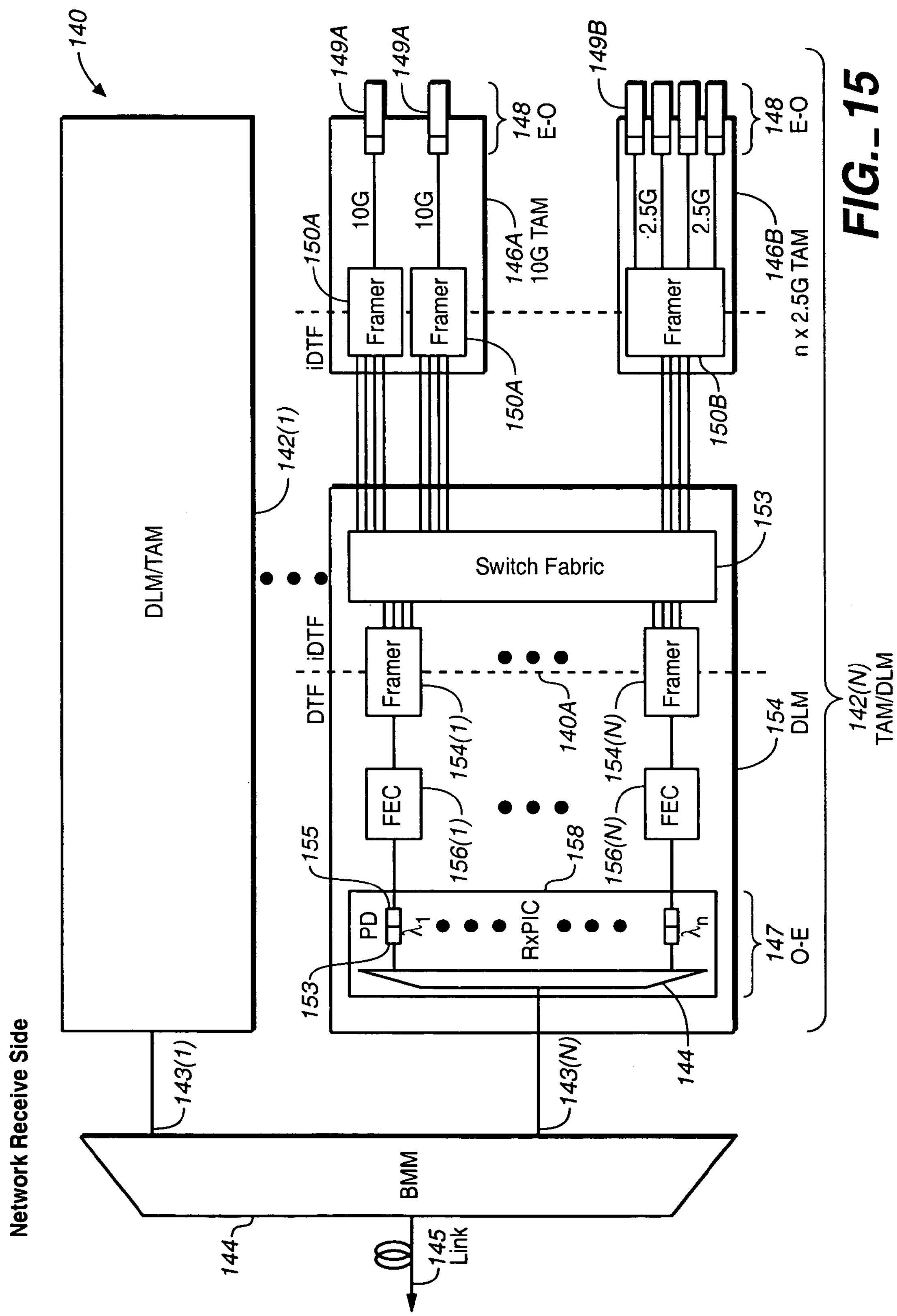
FIG._15

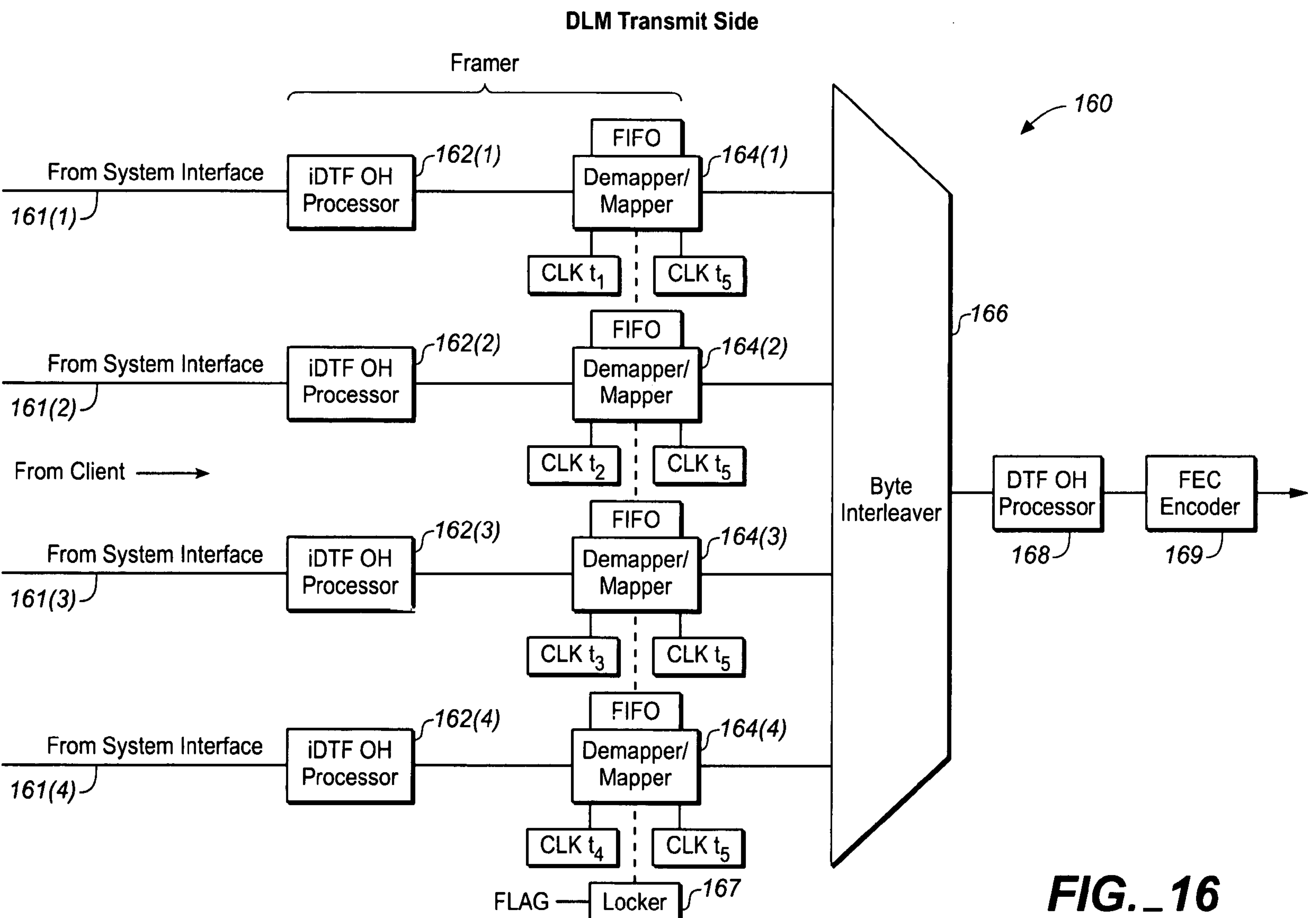
FIG._16

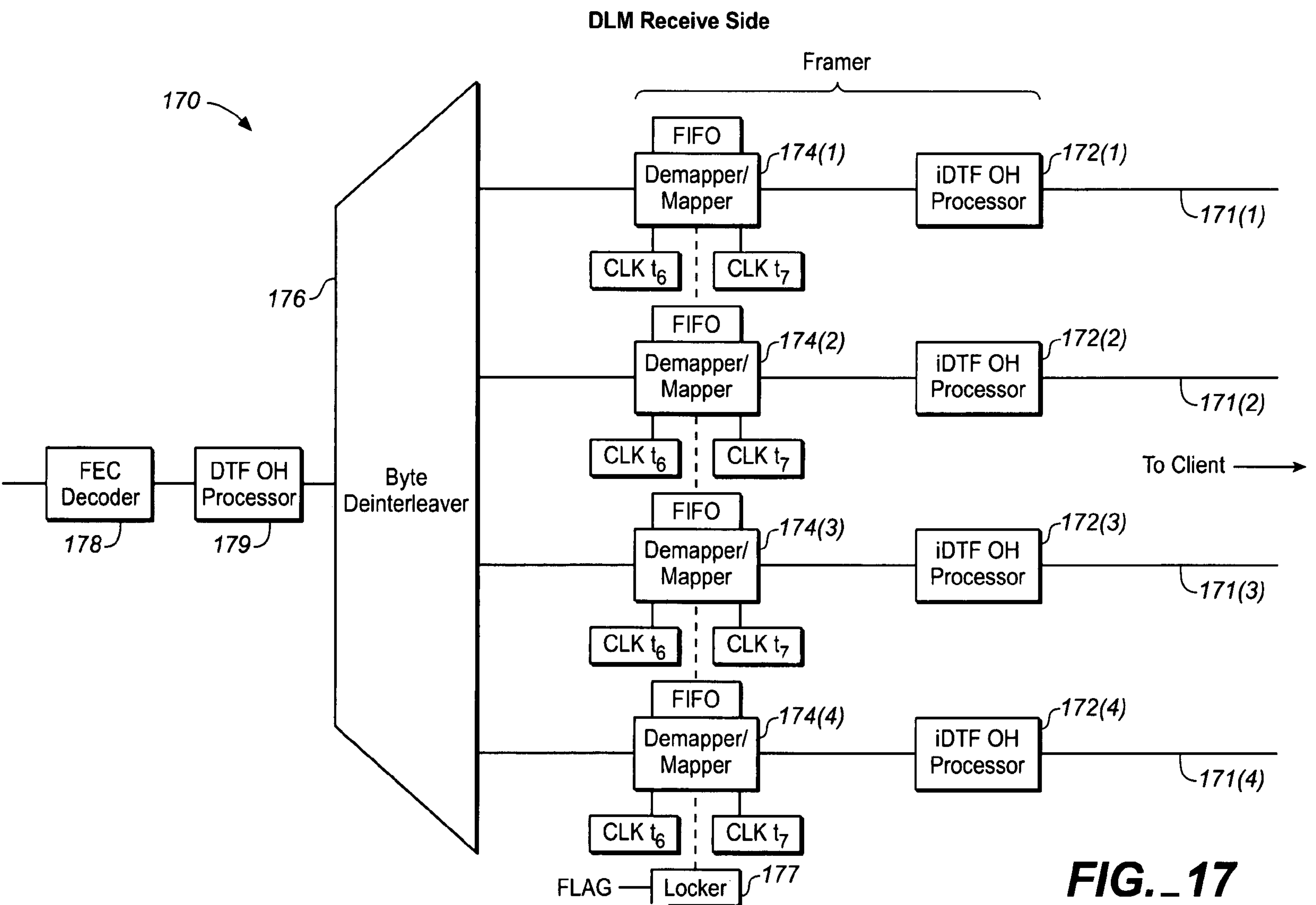
FIG._17

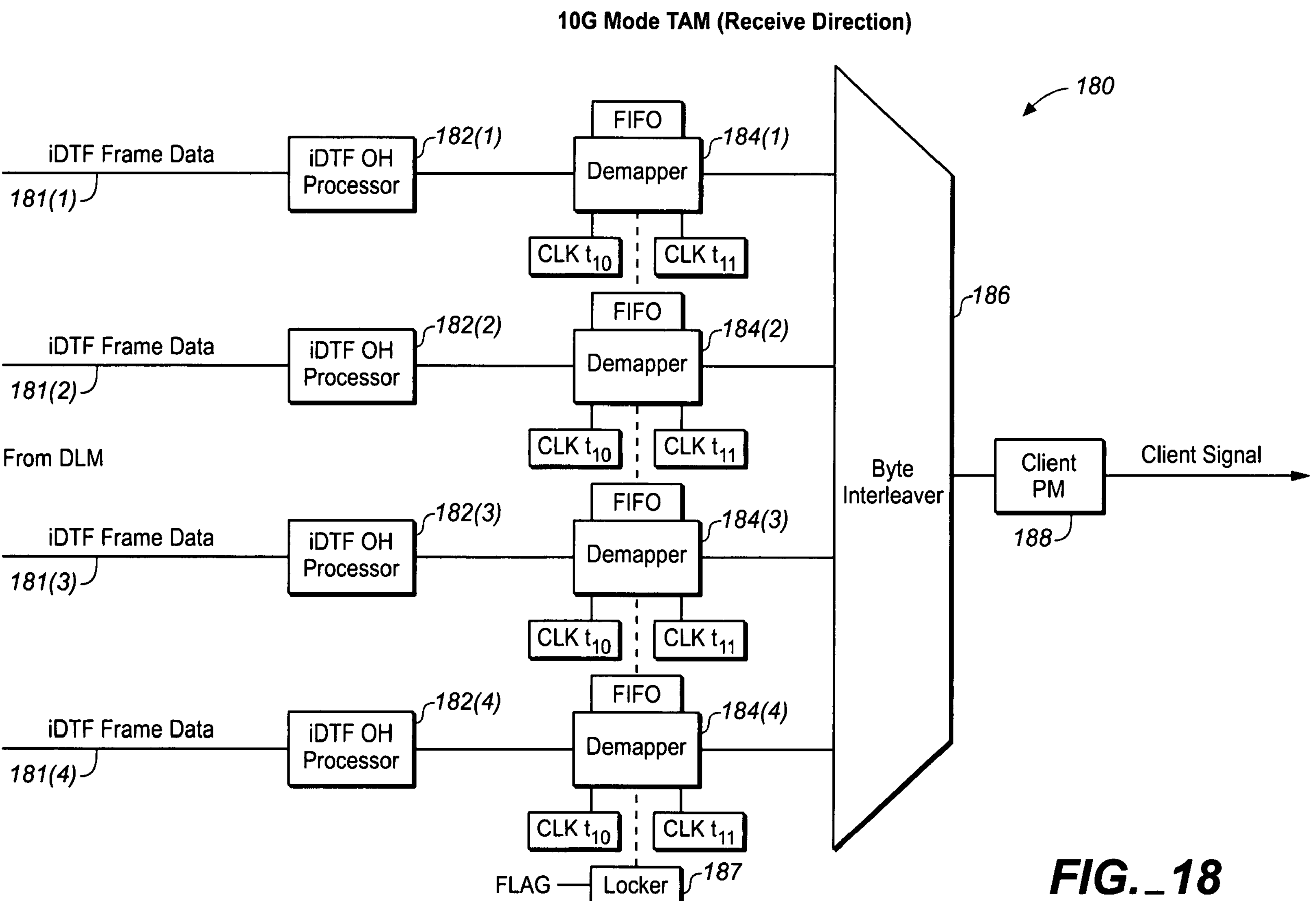
FIG._18

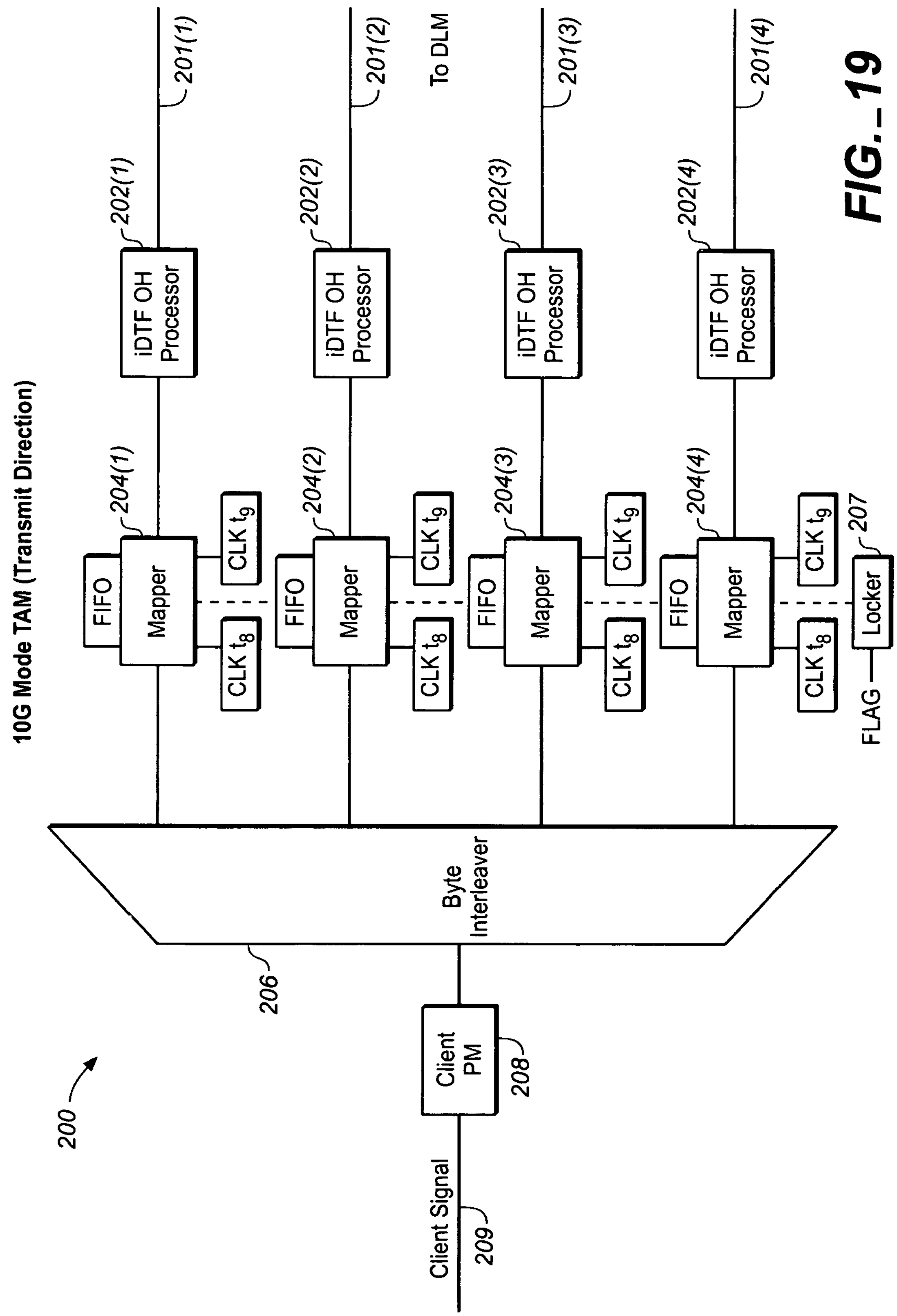
FIG._19

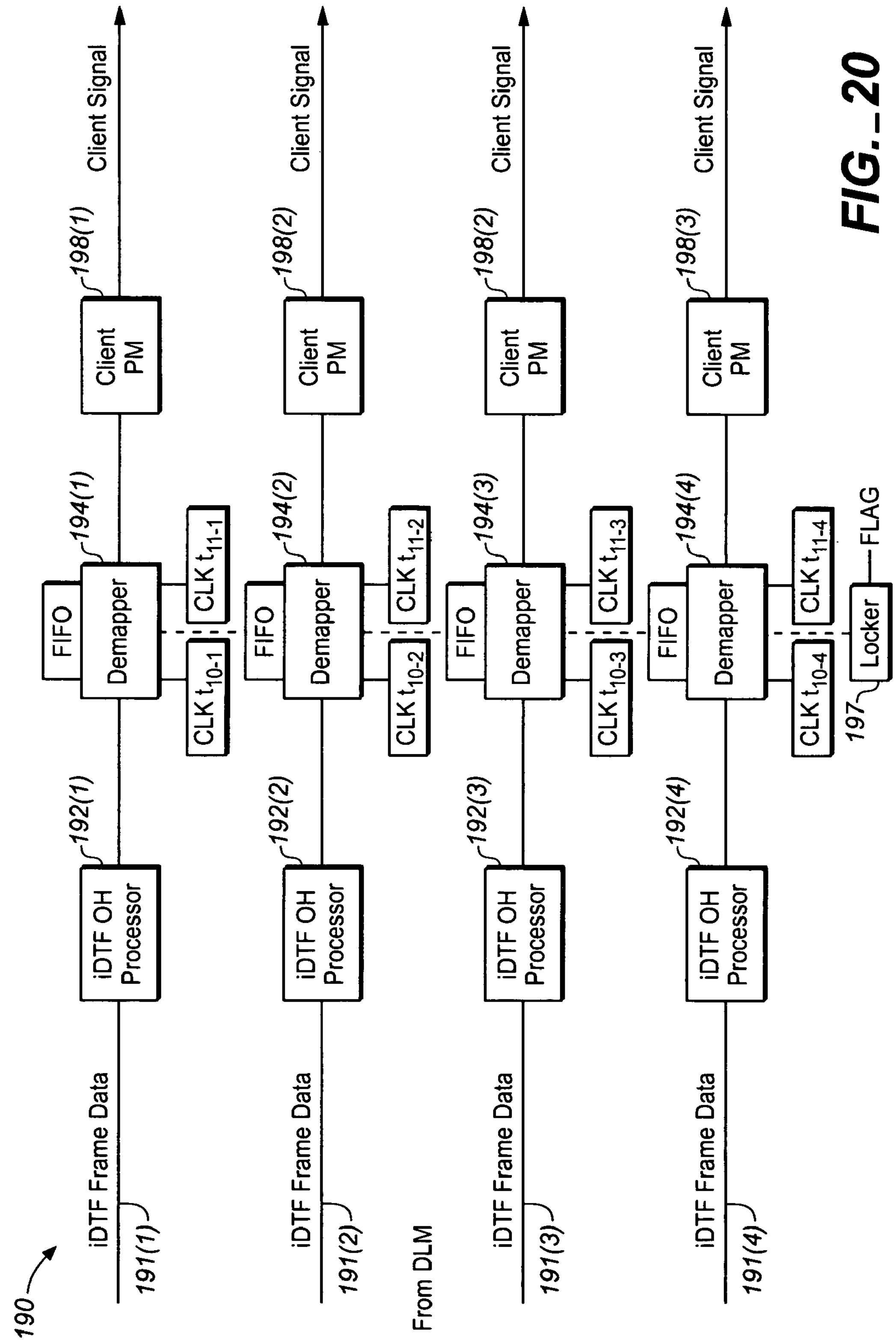
FIG._20

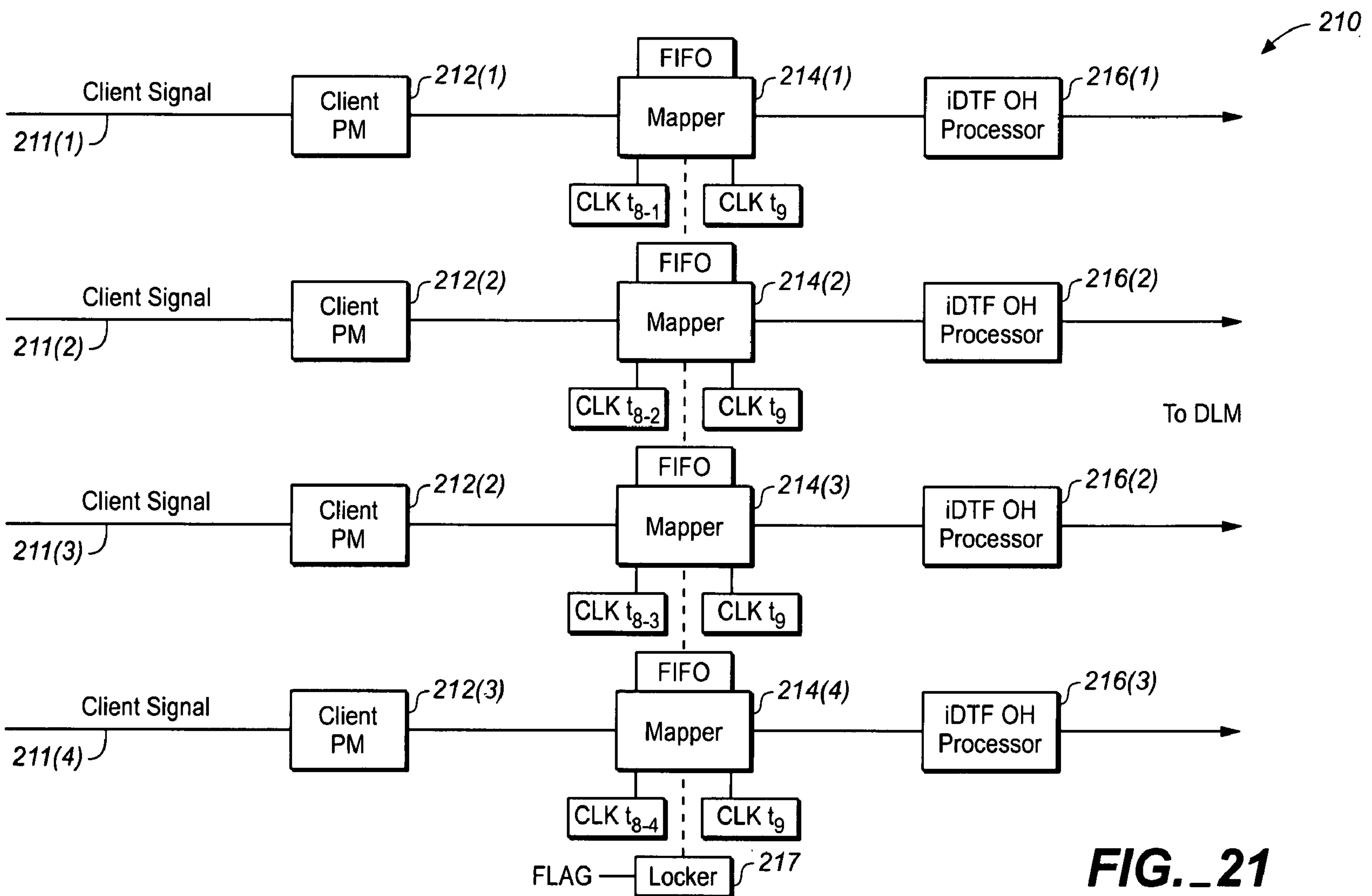
FIG._21

UNIVERSAL DIGITAL FRAMER ARCHITECTURE FOR TRANSPORT OF CLIENT SIGNALS OF ANY CLIENT PAYLOAD AND FORMAT TYPE

REFERENCE TO RELATED APPLICATIONS

This application claims priority to provisional patent application Ser. No. 60/580,240, filed Jun. 16, 2004 and, further, is a continuation-in-part of, and claims priority to, prior U.S. provisional patent application Ser. No. 60/427,159, filed Nov. 18, 2002, which is now U.S. nonprovisional patent application Ser. No. 10/715,947, filed Nov. 18, 2003, entitled OPTICAL TRANSMISSION NETWORK WITH ASYNCHRONOUS MAPPING AND DEMAPPING AND DIGITAL WRAPPER FRAM FOR THE SAME; which is a continuation-in-part of, and claims priority to, prior U.S. provisional patent application Ser. No. 60/392,494, filed Jun. 28, 2002, which is now U.S. nonprovisional patent application Ser. No. 10/267,212, filed Oct. 8, 2002, entitled DIGITAL OPTICAL NETWORK ARCHITECTURE and published on May 29, 2003 as Publication No. U.S.2003/0099018A1, all of which foregoing mentioned provisional and nonprovisional patent applications are incorporated herein in their entirety by their reference.

BACKGROUND OF THE INVENTION

1. Field of the Invention

This invention relates generally to a digital communication system and more particularly to the transport of data signals in an optical transmission network designed to operate asynchronously by means of mapping of the data signals of a first data frame of any desired signal format from a first domain into a second domain having a second data frame and thence into a third domain, which may be an optical link, having a third data frame where the rate of the data frames in the third domain is maintained constant throughout an optical network comprising one or multiple optical links.

2. Introduction

As used herein, the terms “rate” and “frequency” have the same intended meaning. Also, there is discussion about deployment of the invention herein in end terminals or end terminal nodes and intermediate nodes of a transmission network, in particular as exemplified in optical transmission systems and networks following, in part, an Optical Transport Network (OTN) protocol. As used herein, reference to network “node elements (NEs)” is intended to cover both signal “intermediate nodes”, including, but not limited to add/drop nodes, multiple connection nodes in an network (such as handling traffic in greater than bidirectional connections, such as a four-connection node) or gain nodes (such as an analog amplifier node or a digital node that includes re-amplification), of a network as well as signal “end terminal nodes” where the latter are transceiver nodes, transmitter nodes, receiver nodes or transponder nodes. In this connection, end terminals may operate with one accurate oscillator with a phase locked loop (PLL) circuit in the ingress mode but, according to this invention, it is not necessary to employ such PLL clocks at any intermediate node but rather less expensive local reference clocks may, instead, be deployed.

3. Description of the Related Art

The ITU-T G.709 entitled, “Interface for the optical transport network (OTN)”, a proposed international standard for the OTN architecture is intended to converge existing packet services, such as ATM, IP Ethernet, and TDM broadband services as well as SONET and SDH, transparently via the shortest possible stack onto a single network while providing enhanced signal amplification and networking function for all client services. Like SONET, the OTN architecture assumes that the transport function through the network is synchronous in the digital or electrical/electronic domain. Data frames received at the ingress of a G.709 network node are to be retransmitted at the node at an identical frame rate. The G.709 specification also specifies how to synchronously or asynchronously map, for example, the SDH STM-64 protocol data into G.709 OTU2 data frames and visa versa at the ingress and egress of the OTN. The G.709 specification does not, at this point in time, specify how to map IEEE 802.3ae 10 GbE protocol data into G.709 data frames, whether done synchronously or asynchronously.

SONET employs a single timing approach which has a primary benefit of enabling the combining of one or more data streams at a predetermined rate into higher data rate streams and extracting one or more data streams without demultiplexing the entire higher data rate stream. The G.709 protocol basically assumes that intermediate points of the network, i.e., optical cross-connects, optical add/drop multiplexers and the like, operate in a synchronous fashion, even if a digital wrapper provides for asynchronous mapping or demapping of data or overhead are deployed at the network ingress or egress, respectively. This results in added system costs (COGS) because it is necessary, for example, to provide accurate clocking at each node in order to “recapture” the clock of the original transmitter node. Accurate clocking entails the utilization of high cost, phase locked loop (PLL) circuitry and an expense crystal oscillator together with other required system components.

In a plesiochronous clocking system, each subsystem or node in the network may be designed to have its own local clock generation so that different subsystems are operating, at least, at slightly different clock frequencies. To accommodate the different frequencies, bit stuffing techniques are employed. Bit stuffing is well known in the art in many different technical disciplines. For some further background concerning plesiochronous clocking systems, including ways of handing clock differences with a combination phase lock loop/delay lock loop approach, see, for example, U.S. patent application to Tang et al., Publication No. 2002/0075980, published on Jun. 20, 2002 (U.S. patent application Ser. No. 10/029,709).

As indicated above, in the standard G.709 digital wrapper, the payload signal can be mapped into the digital wrapper in two ways, synchronous and asynchronous mapping. In the synchronous mapping case, the digitally wrapped signal frequency is exactly equal to the incoming payload signal frequency times a fixed overhead ratio (F-OHR). If the incoming payload signal frequency varies slightly, that variation is kept track of relative to the digitally wrapped signal frequency. The tracking is down through a justification mechanism. In asynchronous mapping case, the digitally wrapped signal frequency is equal to the payload envelope frequency times a fixed overhead ratio (F-OHR). The payload envelope frequency is generated by the wrapper and is not frequency locked to the incoming payload signal. The frequency difference between the payload envelope and the incoming payload signal is accommodated by some kind of justification mechanism.

In both the conventional synchronous and asynchronous mapping cases, the digitally wrapped signal frequency is scaled with the payload signal frequency. The digitally wrapped signal would be running at a different frequency if the payload signal is at a different nominal frequency. For example, the nominal frequency for OC192 is 9.95328 Gbps with +/−20 ppm variation. If the OC192 payload signal happens to be 9.95328 Gbps+10 ppm, the synchronously mapped G.709 signal would be 9.95328 times the F-OHR or 255/237 Gbps+10 ppm. If this signal is mapped to G.709 asynchronously and the local reference frequency offset is −5 ppm, the asynchronously mapped G.709 signal would be 9.95328 Gbps −5 ppm. The 15 ppm frequency difference between the actual payload signal frequency (+10 ppm offset) and the payload envelope frequency (−5 ppm offset) is absorbed by the justification mechanism.

If the payload type is 10 GbE LAN PHY, the nominal payload frequency is 10.3125 Gbps with +/−100 ppm variation. The synchronously mapped G.709 signal would be 10.3125 times the F-OHR of 255/237 Gbps +/−100 ppm. The frequency offset is identical to the actual payload signal frequency offset. The asynchronously mapped G.709 signal would be 10.3125 times the F-OHR or 255/237 Gbps plus an offset related to the local reference frequency offset. It can be seen that G.709 signal frequency with an OC192 payload type is very different from the G.709 signal with a 10 GbE payload type.

It is also known in the art to convert incoming asynchronous data signals with either a higher or lower frequency than a synchronized data signal frequency by means of negative or positive bit stuffing so that frequency differences are made up, respectively, by the insertion into or removal from of spare bits or bytes in the synchronized data signal. See, for example, U.S. patent application of Rude, Publication No. OS 2001/0022826 A1, published Sep. 20, 2001, now U.S. Pat. No. 6,415,006 B2. Also, see also U.S. Pat. No. 5,757,871. In other schemes, the stuff bytes may be data bytes relative to a negative stuff operation or may be stuff bytes relative to a positive stuff operation as exemplified in U.S. patent application of Walker et al., Publication No. US 2004/0042474 A1, published Mar. 4, 2004.

In spite of the foregoing systems whether synchronous or asynchronous, there is no means for accomplishing the transport of each and every kind of client signal having any kind of data rate in a signal transmission network without providing for highly accurate PLL crystal clocking components accommodating the different signal rates of different type of client signals.

An object of this invention is to achieve a transmission network that overcomes the disadvantages mentioned above.

Another object of this invention is to provide an improved transmission system capable of transporting any signal of a client (customer), whether a standard or proprietary signal, to be transmitted though the deployment of a universal digital transport network.

Another object of this invention is the provision of a single channel rate over a transmission network for other kind of signal transport system for any type of client signal having any kind of designated client payload rate.

SUMMARY OF THE INVENTION

This disclosure involves the provision of digital wrapping of different client signal payloads into N client side frames using stuff bytes to render each client frame size of the same predetermined value which N frames are then interleaved or multiplexed into a line side frame, all of which frames have the same frame rate.

This disclosure involves the utilization of an asynchronous clocking system that provides for the efficient and universal transport of different client signal formats having different payload rates, such as in the case of STS48 and STS192 as well as client or customer proprietary rates to render the network system easily compatible with any and all signal formats protocols and transporting all such different types of client signals over a network at the same or universal line rate.

A universal framer is deployed in a transmission network having a plurality of node elements, where the framer includes a first digital frame for wrapping a client signals having different payload rates for intra-node element transport, and a second digital frame for wrapping N of said wrapped first digital frames into a second digital frame such that the line rate of the wrapped second digital frames inter-node transport between node elements in the transmission network is identical for any transported client signal. Thus, client signals that are to be transported in a transmission network, particularly an optical transmission network, may have different payload envelope rates and are digitally mapped on the client egress side into first transport frames (also referred to in this disclosure as iDTF frames which are intra-node or internal digital transport frames), at the client side for intra-transport within digital node elements and, further, may be digitally mapped into second transport frames (also referred to in this disclosure as DTFs which are digital transport frames) for inter-transport across the network or link which, through byte stuffing carried out in the first transport frames, provides for DTF format to all have the uniformly universal frame rate throughout the network supporting any signal frequency as long as its rate is below the network transport signal rate. At the client signal ingress side, the signal are digitally demapped from the second transport frames (DTF format) into the first transport frames (iDTF format) where the stuff bytes are removed and accordingly processed at an intermediate node element (also, known as a tributary adapter module or TAM) before further transport or digitally demapped from the first transport frames (iDTF format) to reproduce or reassemble the client signal or signals comprising the client payload at the client payload envelope rate for reception at the client's equipment.

Among various features disclosed, two predominate features are (1) a single channel or network rate for transport of all signals between network node elements and end terminal node elements and (2) the digitally wrapping of different types of payloads into N client side (iDTF) frames using stuff bytes to render each frame size equal to a predetermined value which then are interleaved or otherwise wrapped into line side (DTF) frames for transport over the network at the same high speed line rate. The client side framers may be, for example, running at the lowest signal rate encountered, to digitally wrap in parallel N client signals or digitally wrap a client signal multi-sected into N parts, where these two different client signals have different payload rates.

Thus, the disclosure is directed to a transmission system for transmission of client signals between network node elements in a communication network that includes a client side frame format for wrapping client signals of any format type to and from client signal equipment, that client side frame format having client side frames that are rendered substantially the same size for any type of client signal by insertion of stuff bytes into each client side frame, and a line side frame format for wrapping N of the client side frames into a line side frame such that all of the line side wrapped signals have the same line rate between node elements in the network.

In more particularity, any given signal protocol, including both standard and proprietary, is mapped into a client side payload envelope, e.g., an iDTF frame, that has a fixed frame byte rate, i.e., the byte rate of this digitally wrapped frame is always the same for any given signal type received from the client. To always achieve this same bit or byte rate, stuff bits or bytes are inserted in the frame wrapper, such as placed in or distributed throughout the client signal payload or in the overhead (OH) or FEC or in any combination of the foregoing, so that the frame rate remains continually the same for every client side frame. N such client side frames (N may be presently equal to 4 but can be a higher or lower value) of equal size are interleaved (wrapped) into a line side frame, e.g., a DTF frame. It does not matter what signal is in the frames or what kind of signal is being transported. Then, in wrapping the client side frames, a simple flag is utilized to either lock these N frames to the same justification (JC byte) and the same NSB1 and NSB2 values, which will be explained in detail later, such as in the case of an STS192 signal, or not to lock these N frames together but rather permit individual justification (JC bytes) so that they are treated independently as to justification (JC byte) and NSB1 and NSB2 values, such as in the case of different STS48 signals, and using the same circuit logic, such as deployed in ASIC chips, to accomplish these tasks on different signal formats. Also, as a further important feature with regard to the foregoing is that the back plane and crosspoint switching in each network node element is carried out at, for example, at the lowest encountered client signal rate such as, for example, say at 2.5 Gbit granularity, so that whether a 2.5 Gbit signal format (conventional, e.g., standard), a 2.7 Gbit signal format (non-conventional, e.g., proprietary), a 9.1 Gbit signal format (non-conventional, e.g., proprietary), or a 10 Gbit signal format (conventional, e.g. standard) is being transported, the client side frame setup transports either type of format without requiring any additional costs, using the same ASIC chips and IC signal processing chips. Thus, the same equipment can easily handle both STS48 and STS192 signals as well as other signals having standard or proprietary payload rates.

Although it initially may initially appear to be somewhat subtle to one of ordinary skill in the art, the forgoing explanation supports a "plug and play" architectural approach that is not seen in existing or known signal network systems in that, since different signal formats having different non-standard signal rates, such as 2.1 or 2.3 Gbps (Gb/s), can be digitally wrapped or mapped into the same client side frame in a tributary access module (TAM), additional such modules or TAMs can be added to meet new traffic demands for additional signals of the existing protocol type (STS48 and STS192) or even modules with different proprietary protocol types. The existing circuit logic can handle these additional or different protocol signals at no additional cost to the service carrier provider because of client side digital wrapper architecture. This can be particularly helpful at add/drop network nodes because new TAMs or client side tributary modules for particular signal payload types or proprietary signal transport rates can be installed using the same, previously installed line side module (also known as a digital line module or DLM) which is responsible for the line side digital wrapping. New DLM/TAM node sites, for example, may be easily added at existing optical amplifier sites to provide a new add/drop site including OEO signal regeneration, possibly at less cost than such traditional node element systems depending upon the architecture. Thus, any different or new signal format or protocol with different frame rates can be digitally wrapped by the client side (iDTF) framers separate from the line side (DTF) framer and always resulting in the same client side signal frame size so that the line side framer wrapping N client side frames has a line side rate that remains always the same and does not need to be changed or redesigned for a new signal format with a different operational frequencies, payload rates and frame rates.

While the foregoing principals are discussed, in general, for application to an optical transmission system or network, it will be readily apparent to those skilled in the art that the principals of operation disclosed are also equally applicable to the transmission or transport of electrical signals in a digital transmission system capable of handling electrical signal transport of different payload rates.

The OTN transport data frames may also be modified to permit an asynchronous transmission network that has a single line frequency or rate between end terminal node elements and intermediate node elements or between intermediate node elements of the network wherein the digitally wrapped signal frequency is equal to the payload frequency times a variable overhead ratio (V-OHR), which ratio varies with respect to the particular the client signal payload type.

The optical transmission network disclosed is inherently asynchronous due to the utilization of a variable overhead ratio (V-OHR). As disclosed in prior patent application Ser. No. 10/267,212, supra, the network architecture used in conjunction with the network system here makes extensive use of OEO signal regeneration, i.e., deals with any electronic reconditioning to correct for transmission impairments, such as, for example, FEC encoding, decoding and re-encoding, signal re-amplifying, signal reshaping, signal retiming, signal frequency conversion as well as signal regeneration. As indicated in patent application Ser. No. 10/267,212, the current trend for future optical transmission networks by designers is to design such networks with systems that are all optical in nature including OOO signal regeneration and optical cross-connect switching. However, the costs of OEO signal regeneration can be effectively reduced in cost by the employment of photonic integrated circuit chips along with IC and/or ASIC chips together with an architecture that permits the universal acceptance of present as well as future client signals regardless of their payload size or payload envelope rate. The optical transmission network includes an asynchronous clocking system with intermediate node elements designed to operate asynchronously with a single local frequency clock without complicated network synchronization schemes employing high cost clocking devices such as phase locked loop (PLL) control with crystal oscillators and other expensive system components. The asynchronous network operation provides for asynchronous remapping of any client signal utilizing any type of signal data protocol where the line side frequency is always the same frequency for the transported signal and the local frequency at a terminal or intermediate node element is set to a local reference clock in accordance with the payload type and its overhead ratio (OHR), i.e., the overhead ratio is varied to meet the desired difference between the line rate or frequency and the client signal payload rate for the client signal payload type as well as for any future client signal payload types. As an example, the payload type may be either OC192 or 10GigE but their respective line rates or frequencies over the transmission fiber or medium will always be the same identical line rate. In this way, there is no second guessing (trial and error) or initial determination of what the line rate might be in order to determine what the frequency of local clock at an intermediate node element down the optical transport link to be the same as or commensurate with the original client payload frequency.

The asynchronous digital transport network (ADTN) which may be based, in part, upon the ITU-T's G.709 Interface for the Optical Transport Network (OTN) standard that makes use of Optical-Electronic-Optical (OEO) conversions at terminal or intermediate node elements but where the node elements operate inherently asynchronously with respect to each other without complicated and costly network clock synchronization schemes, such as expense PLL controls. The asynchronous network (ADTN) operation may be accomplished by having a line side signal operation at a constant rate throughout the network but a different local clock rate at an intermediate node element, for example, where local or intra-rate is at a different client side rate. The difference in the line side signal rate and the local clock rate at the node element are accommodated through asynchronously remapping of the line side wrapped client signal.

Basically, the OTN employs high cost clocking devices within node elements (NEs) such as phase locked loop (PLL) controllers with crystal oscillators or other expensive system components, whereas the asynchronous mapping and remapping in the disclosed ADTN allows the elimination of these otherwise necessary and expensive system components. This elimination significantly reduces the overall costs in the manufacture of optical transmission networks, network systems and node or network elements.

Thus, a method and apparatus is disclosed for the handling of client payload and G.709 overhead in different time domains where the signal payload, overhead and forward error correction (FEC) code is handled at a first frequency, and where the signal payload overhead and forward error correction (FEC) coding between node elements (NEs) is handled at a second frequency. Time differences in the data frame structure due to different operational frequencies is handle via specified bytes in the frame structure, such as the ODUk Overhead and OPUk Overhead, via write to and read from a buffer between receiver and transmitter overhead processors, e.g., a circular buffer. The system architecture can easily handle a multitude of different client signal protocols, such as, for example, including but not limited to OC48/STM16, OC192/STM64, OC 678, 10GE LAN Phy, 2×GigE or 10G Fiber Channel (10GFC) and any other protocols and their standards that may come along in the future. The reason that the architecture can handle unknown, future protocols is that the transmission of client signals is always accomplished at the same line rate between any network node elements (NEs). The logic circuitry at any intervening or intermediate node element need only have offset information relating to the overhead ratio (OHR), which is a variable ratio depending on the client signal payload type, between the original client signal line rate and what we call the effective payload rate. The effective payload rate is defined as the signal line rate over the overhead ratio (OHR). In the case of the G.709 standard, the OHR remains at all times fixed. In the case here, the OHR varies as the client signal type changes (different signal formats or protocols) so that the network line rate will remain fixed at all times. Where different signal formats or protocols are handled in the same network intermediate node, for example, such a G.709 signals and SONET signals on the same channel, it would be necessary to have two different PLL clocking circuits in the signal path to accommodate the different signal frequencies. With the deployment of the digital wrapping and asynchronous clocking system of this method and apparatus, such circuits are not required. Separate free running clocks can be deployed for handling different client signal types or protocols in an asynchronous manner at the intermediate node element as well as terminal node elements except for the egress side of the client side tributary access module or TAM, in which case a single PLL clocking circuit is utilized.

A further feature disclosed is the distributed format of the forward error correction (FEC) coding along the client signal frame payload in each row of the payload data frame thereby reducing the required size or capacity of a circular buffer in the logic circuitry to permit the conversion of client signal payload from a first time domain into a second time domain and vice versa.

Thus, in summary, the approach here permits the deployment of free running clocks in subsystem circuitry at an intermediate or terminal node element rather than utilizing PLL circuitry employing crystal oscillators, which are a necessity for synchronous clock operation required in the OTN and the present G.709 protocol, thereby reducing system costs. Also, by using local clocks, all signal jitter accumulation is eliminated at each intermediate node element since the client signals are regenerated at each node, according the basic architecture set forth in U.S. patent application Ser. No. 10/267,212, supra, referred to therein as a digital optical network (DON). Such a network is also disclosed in U.S. patent application Ser. No. 10/267,212, filed Oct. 8, 2002, and published on May 29, 2003 as U.S. 2003/0099018 A1, which application is incorporated herein by its reference. The client payload signals are also regenerated at each intermediate node element in the network and, in addition, are FEC encoded/decoded at each node too. Thus, there is no accumulated phase noise (jitter) or signal error from one intermediate network node element to the next, which is an important feature.

Another feature is directed to first (client) and second (line) electronic circuit cards with the first electronic circuit card being one of a plurality of such first electronic circuit cards with card selection for operation with said second electronic circuit card is dependent on the type of client signal payload rate to be transported so that one or more of said first electronic circuit cards are selectively coupled to the second electronic circuit card for transport of one more client signals of different client signal payload types. Thus, a transponder comprising a client side module (TAM) and a line side module (DLM) where the line side module is the same through out the node elements (NEs) utilized in the network so that the same, identical line card can be deployed for any transponder because this card will always have the same line rate due to the inter-digital wrapper having the same line signal frame format and line rate, also called the DTF frame format. On the client side, there is built a different client side card (TAM), such as a printed circuit board (PCB) card to handle one or more signal protocols, such as of the signal types previously mentioned above, for example, OC-48 or STS48, or OC149 or STS92. Thus, the client side card employs the intra-digital wrapper with the iDTF frame format so that regardless of the client signal format and payload envelope type, the line side module or DLM can receive the N-iDTF transport frames of the client signal, with all frames of the same size due to byte stuffing, and remap them into a universal line side signal (DTF) frame having a line side rate that is basically identical for any and all iDTF frame digitally wrapped signals.

It should be noted that this invention may be employed in any synchronously operated optical transmission network where asynchronous operation is desired for either the overhead signal type or the payload signal type, or both. Therefore, this invention has additional utilities and applications beyond the utility disclosed here in conjunction with SONET and OTN standards.

With respect to the foregoing, a further feature is optical transponder apparatus that comprises a plurality of client signal side (TAM) PCB cards and at least one line signal side (DLM) PCB card which makes it readily simple to match desired client side signal options, protocols and payload types with a universal line side card. The universal line side card or cards may be the same in all cases since the signals from corresponding one or more client side cards with be digitally wrapped within the same frame structure or the iDTF transport frame format, and with the line card clocking out N client digitally wrapped (iDTF) signal frames into a DTF transport frame at the same universal line rate relative to all signals transported from or received by a node element (NE). Moreover, an “off-the-shelf” TAM client card for any standardized, quasi-standardized or proprietary signal formats, such as, but not limited to, OC192/STM, OC48/STM, OC 678, 10GE LAN Phy or 10GFC and any other formats that may come along in the future, can be readily installed for a client (commonly referred to as a service provider or a communication service provider) servicing of such standardized, quasi-standardized or proprietary signal formats. Even further, if a client has a specific kind of proprietary signal format, such as, for example, 2.8 Gbps second frame format, a TAM can readily be provided to accommodate that signal format since the line card can accept any signal format as digitally wrapped for intra-node element (iDTF) transport frame and further digitally wrapped for inter-node (between node) element (DTF) transport frame. Furthermore, each client side signal option can provided with a corresponding signal format adapted client card (TAM) and multiple wavelength choices (N λs) can be provided for line signal side options relative to plural line side cards (DLMs). As an example, a first line side or DLM card can provide for multiplexed output wavelengths, $\lambda_1$-$\lambda_{12}$, a second line side or DLM card can provide for multiplexed output wavelengths, $\lambda_{13}$-$\lambda_{24}$ a third line side or DLM card can provide for multiplexed output wavelengths, $\lambda_{25}$-$\lambda_{36}$, an so on, covering wavelengths in the C band as well as including other bands, such as the L or S band of signal wavelengths.

From the foregoing, it can be then seen that such a transponder can include, for example, a single mother PCB for three different kinds of cards to meet the requirements of a digital optical network (DON) as discussed in U.S. patent application Ser. No. 10/267,212, supra, comprising at least one client card (TAM) having one or more desired and accepted client signal formats at a terminal end node element (NE), at least one line card (DLM) for providing the transport or reception of multiple wavelength signals from an optical signal line at a terminal end node element (NE), such as a long haul optical fiber, and a third card at an intermediate node element (NE) having a cross-connect capabilities to either pass through client signals after 2R or 3R functionality as well as add/drop of some client signals with some signal grooming as desired via appropriate client tributary cards or TAMs forming part of such an intermediate node element.

A further feature disclosed is the provision of line-to-line cards (back-to-back DLM cards) at an intermediate node element, such as an optical-electrical-optical regenerator (OEO REGEN) or repeater that permit client or customer access in the future through the plug-in at the intermediate node of appropriate client side or TAM cards for communication with the line-to-line cards.

Another feature in the disclosure is a method directed to universally accommodating any client signal with any type of payload type and rate in a transmission system for transmitting client signals among node elements in a network, comprising the steps of mapping a client signal into first transport frames, adding stuff bytes in the first transport frames so that each first transport frame size is the same for all client signal payload types to be transported, mapping the first transport frames into second transport frames each having an identical frame size; and transporting the second transport frames over the network in all cases at a substantially identical network rate. At an end terminal node, the reverse steps takes in that the received second transport frames are remapped into the first transport frames, the stuff bytes are removed and the client signal and payload are restored with the client clock rate.

It will be realized by those skilled in this art that, while embodiments disclosed in this application are directed to transport systems for optical transmission networks that involve the transport of client signals up to 10 Gb/s at a line rate such as, for example but not limited to, 11.1 Gb/s, in the future systems, the client signals may be 40 Gb/s or 100 Gb/s and so on so that the utility of the method and apparatus disclosed can be readily scalable to higher transport signal rates. For example, the transport system may in the future be 100 Gb/s with a line rate of 110.1 Gb/s line rate and capable of accommodating any client signal having a payload rate of 100 Gb/s or less, such as 40 Gb/s, 10 Gb/s, etc. down to, for example, 2.5 Gb/s.

Other objects and attainments together with a fuller understanding of the invention will become apparent and appreciated by referring to the following description and claims taken in conjunction with the accompanying drawings. The drawings are not necessarily to scale so that emphasis instead is placed on the principals and features of the invention.

BRIEF DESCRIPTION OF THE DRAWINGS

In the drawings where like reference symbols refer to like parts or elements:

FIG. 1 is a high level schematic view of a 3R optical transmission network.

FIG. 2 is a schematic diagram of the G.709 Optical Transport Module (OTM).

FIG. 3 is a schematic view of the G.709 frame structure.

FIG. 4 is a schematic view of a modified G.709 frame structure utilized in connection with this disclosure.

FIG. 5 is a schematic view of a line side frame structure utilized in client signals in connection with this disclosure.

FIG. 6 is schematic view of a node side frame structure utilized in connection with this invention.

FIG. 6A is a detail of one of the payload groups in the node side frame shown in FIG. 6.

FIG. 7 is a schematic view of an intermediate node in a transmission network utilizing this disclosure.

FIG. 8 is a block circuit diagram of a digital line module (DLM) that may be employed in the practice of this disclosure.

FIG. 9 is a more detailed circuit diagram of a forward error correction (FEC) Serial to Parallel (SerDes) signal transformation that may be employed in the DLM circuit a shown in FIG. 8.

FIG. 10 is a detailed block circuit diagram of an OEO optical transport network intermediate node element (NE) illustrating the deployment of the asynchronous remapping of client signals which may of different payload types.

FIG. 11 is a high level schematic diagram of a node element (NE) comprising an end terminal node of this disclosure.

FIG. 12 is a schematic diagram of a node element (NE) comprising an intermediate node element of this disclosure, which may also be called a digital amplification node or an OEO REGEN node.

FIG. 13 is a schematic diagram of a node element (NE) comprising a cross-connect and add/drop node element of this disclosure.

FIG. 14 is a more detailed schematic diagram of a portion of an end terminal node element relative to the transmission of optical signals from the client side to the line side of such a node element according to this disclosure.

FIG. 15 is a more detailed schematic diagram of a portion of an end terminal node element relative to the reception of optical signals according to this disclosure.

FIG. 16 is a more detailed schematic diagram of a transmit side (egress) of a transmitter terminal node element in FIG. 14 illustrating the DLM transmit side of the architecture for asynchronous clocking of client signals as digitally mapped in the iDTF transport frame format are then remapped into the DTF transport frame format.

FIG. 17 is a more detailed schematic diagram related to a receiver side (ingress) of a receiver terminal node element in FIG. 15 illustrating the DLM receiver side of the architecture for asynchronous clocking of client signals as digitally demapped from the DTF transport frame format on the line side and then remapped into the iDTF transport frame format.

FIG. 18 is a more detailed schematic diagram of the client side tributary card or TAM in the receive direction for recovery of a 10 Gbit mode client signal in the iDTF transport frame format with reception from a DLM.

FIG. 19 is a more detailed schematic diagram of the client side tributary card or TAM in the transmit direction for transmission of 10 Gbit mode client signal via the iDTF transport frame format and for reception by a DLM for transmission.

FIG. 20 is a more detailed schematic diagram of the client side tributary card or TAM in the receive direction for recovery of 2.5 Gbit mode client signals in the iDTF transport frame format with reception from a DLM.

FIG. 21 is a more detailed schematic diagram of the client side tributary card or TAM in the transmit direction for transmission of 2.5 Gbit mode client signals via the iDTF transport frame format and for reception by a DLM for transmission

DETAILED DESCRIPTION OF THE INVENTION

The digital optical network disclosed here is inherently asynchronous, and makes extensive use of OEO conversions at intermediate nodes, such as, signal regeneration nodes in the network, to provide "3R" functionality, i.e., any electronic signal reconditioning to correct for transmission impairments as well as 3R processing, such as, for example, but not limited to, FEC encoding, decoding and re-encoding, in addition to signal re-amplification (1R), signal reshaping (2R) and signal retiming (3R). See U.S. patent application Ser. No. 10/267,212, supra. In both of these respects (i.e., asynchronous operation and signal reconditioning), this network architecture partially runs counter to key architectural principles embodied in the ITU-T OTN architecture in general, and to the G.709 standard layering hierarchy in particular. In order to understand the application of this invention, it is important to understand digital wrapping as set forth in the current proposed draft for the G.709 protocol. The draft ITU-T Recommendation G.709 is part of a larger international standards effort for the propose of providing an optical transport network (OTN) architecture intended to converge existing packet (ATM, IP and Ethernet) and TDM (SONET and SDH) broadband services, transparently and via the shortest possible physical stack, onto a single network, while providing enhanced amplification and networking functionality to all client services. While some background detail of the OTN payload frame is provided in the description of several figures, further detail is provided in "ITU-TG.709 Interface for Optical Transport Network (OTN)", (www.itu.int/ITU-T), which is incorporated herein in its entirety by its reference.

A principal aim of OTN architecture is to enable multiple service transport of packet based data and legacy traffic. The digital wrapper overhead structure accommodates management and monitoring of each optical channel wavelength. Thus, the wrapper overhead (OH) makes it possible to manage and control client signal information with the addition of OH at several overhead sections of the OH portion of the OTN frame constituting the client signal. Like SONET, the OTN architecture in G.709 assumes that the transport function through the network is synchronous in the digital domain. Frames received at the ingress of a G.709 network node are assumed to be re-transmitted at the node egress at an identical frame rate of their origin. Rate adaptation between the network and the client signal is performed only at the network edge, such as at end terminal nodes at client tributary interfaces. The key OTN concepts are the Optical Transport Module (OTM) which includes the Optical Channel (OCh), and the digital wrapper frame structure comprising three sets of overhead (OH) information.

To begin with this explanation, reference is made to FIG. 1 which shows a portion of G.709 networking where the client signal to be transmitted, for example, between two end terminal nodes or elements (STE) in an optical path or link which may include intermediate nodes such as optical amplifier (OA) nodes and signal regeneration (3R) nodes. The span in the optical link between 3R intermediate nodes in the G.709 protocol is called the optical channel transport unit (OTU) and the end-to-end link, such as between end terminal nodes (STE) is called the optical data unit (ODU). The OTU is generated for each span or hop while the ODU is generated at the ingress and egress points of the client signal as indicated in FIG. 1. Thus, there may be several OTU paths (three shown in FIG. 1) within a single ODU path.

Reference is now made to FIG. 2. The purpose of OTN is to enable multi-service transport of packet-based data as well as legacy traffic. The OTN digital wrapper accommodates non-intrusive management and monitoring of each optical channel signal. The wrapped overhead (OH) therefore makes it possible to manage and control client signal information. An OTM-n structure supports n optical channels on a single optical span. Services such as 3R regeneration and termination of the OTUk frames and overhead may be provided at each end. This enables supervision and maintenance of the OTM interfaces at each location. As shown in FIG. 2, in the optical transport module (OTM), the OTN management capabilities are achieved through the deployment of several layers in the transport of the client signals together with associated overhead. These layers in more detail include the client unit or layer, the optical channel payload unit or layer (OPUk) and the optical channel data unit or layer (ODUk) together with associated overhead (OH). The ODUk includes, in addition, the forward error correction (FEC) coding section.

Thus, the OTN frame consists of the overhead (OH) section, the payload section and the FEC section, which may be a Reed-Solomon RS (255,239) code which enables the correction of n symbol errors in the payload. As shown in FIG. 2, the OH section and the FEC section of each frame are added to the optical transport unit (OTU). This is then carried for each channel signal (OCh) so that for each optical channel, additional OH must be added to handle additional signal management functionality for the OTN. The Optical Multiplexing Section (OMS) and the Optical Transmission Section (OTS) are put together using the additional OH together with the OCh (OTUk).

Thus, G.709 protocol makes use of the OTNs Optical Channel (OCh) layer, which allows STM-N, IP, ATM and Ethernet signals to be digitally mapped (wrapped) into several frames, adapted to a constant bit rate, and then digitally multiplexed. The OCh is then mapped onto an Optical Channel Carrier (OCC), which is a channel wavelength. G.709 protocol specifies standard client-independent in-band overhead for "λ" and "multi-λ" signals, and defines separate "non-associated" or "out-of-channel" signals to be carried out-of-band between network or node elements (NEs).

OChs (or OCCs) can be optically multiplexed together to create an Optical Multiplex Section (OMS), such as an optical channel group (OCG) or band in the optical transport system. An OMS may be transported over a span of fiber optic cable that constitutes the Optical Transmission Section (OTS), along with an optional Optical Supervisory Channel (OSC). The OTM Overhead Signal (OOS) is carried by the OSC over the OTS, and contains OTS, OMS and OCh (i.e., non-associated) overhead and general management communications.

Within an OCh, the client digital signal is first "wrapped" in an OCh Payload Unit (OPUk) frame. The OPUk framing level provides rate adaptation of the client signal to a constant bit-rate k, where k=1, 2 or 3 which is, respectively, ~2.5, ~10 or ~40 Gbps (specifically 2.66 Gbps, 10.7 Gbps and 43 Gbps, respectively). The overhead associated with the OPUk (OPU-OH) identifies the payload type to the final adaptation layer devices, and provides other client-specific adaptation functions between path ends. The OPUk, including its overhead, for frame X is parity-checked, and the resulting BIP-8 value is inserted into the OTU or ODU overhead (OH) for frame X+2.

The OPUk frames are next "wrapped" in an OCh Data Unit (ODUk) frame with its associated overhead (ODU-OH). The ODUk provides path-layer connection monitoring functions, and the ODU-OH includes information for maintenance and operational functions to support the OChs. The ODUk OH consists of portions dedicated to the end-to-end ODUk path monitoring (PM) and to six levels of tandem connection monitoring (TCM), which may be nested or may overlap. The ODUk path OH is terminated at each point that the ODUk frame is assembled and disassembled. The TCM OH is inserted at the source and terminated at the sink of the tandem connection, respectively.

The digital ODUk frame is then FEC-encoded and wrapped in an OCh Transport Unit (OTUk) frame. The OTUk layer conditions the ODU for transport over an optical channel connection. It also provides error detection and correction, and section layer connection monitoring functions. As previously indicated, OTUk overhead also includes the Reed-Solomon RS (255,239) forward error correction (FEC) codes. The entire OTUk frame, except for the frame alignment signals (FAS and MFAS), is scrambled to insure sufficient bit-timing content.

In connection with the foregoing discussion, a specific example is the digital wrapper of four STS48 signals (2.5 Gbps) are mapped into one OTU1 frame. Then, for 10 Gbps transport, four OTU1 frames are mapped into one OTU2 frame. In the G.709 format, two different OH layers are necessary for each of the OTUk frames. On the other hand, a STS192 signal (10 Gbps) is mapped directly into an OTU2 frame.

Reference is now made to FIG. 3 which illustrates in more detail the G.7-709 frame structure. The overhead (OH) at the beginning of the frame consists of the OTU section overhead, ODU section overhead and the OPU section overhead. The former two sections will not be discussed here but what is of particular interest relative to this application is the OPU section overhead. The client-specific OPU overhead for 10G constant bit rate signals (CBR10G), for example may be comprised of three Justification Control (JC) bytes, Negative Justification Opportunity (NJO) byte, and 3 bytes reserved for future international standardization (RES). The OPU payload for these mappings comprises 4×3808 bytes (4 rows by 3808 columns), including 1 additional byte of overhead, the Positive Justification Opportunity (PJO) byte, embedded in column 17 (row 4) of the payload section. The asynchronous and bit synchronous mapping processes generate the JC, NJO and PJO bytes which are employed in a demapping process. Thus, the Justification Control (JC) signal, may be located in rows 1, 2 and 3 of column 16, bits 7 and 8, is used to control the two justification opportunity byte NJO in column 16, row 4 and PJO byte in column 17, row 4. The JC bytes consist of two bits for justification control and six bits reserved for future international standardization. In column 16, row 4 is the Payload Structure Identifier (PSI) which includes the Payload Type (PT) so that a network element (NE) can identify the client signal payload type in order to determine the digitally wrapped signal frequency or line rate.

To be noted is that the G.709 frame structure is divided into three main sections: frame overhead (OH) which comprises columns 1-16 by 4 rows (column 17, row 4 the PJO byte), the client signal payload which comprises columns 18-3824 (representing 3808 bytes per row for 4 rows), and the FEC coding comprising columns 3825-3840 by 4 rows. The data in a frame is sent and read out by the logic circuitry serially, row by row, from row 1 to row 4, for each frame. Thus, tucked between each row of payload is FEC coding plus frame OH, i.e., the FEC and OH are interleaved with the client payload. From this point of view, the FEC and OH can be said to be "coarse" distributed within and along a frame.

It is should be realized that the particular location of bytes in the frame OH is not fixed in the sense that they cannot be relocated to another location in a respective OH section, unless the requirements are to follow in detail the OTN standard. Thus, the OH bytes can be replaced elsewhere in the OH or even some in the payload (PL) according to the designer as long as the logic circuitry reading out locations in the OH has knowledge of the addressed locations for particular or designated OH data.

As indicated previously, in standard G.709 digital wrapper, the payload signal can be mapped into the digital wrapper in two ways, synchronous mapping and asynchronous mapping. In synchronous mapping case, the digitally wrapped signal frequency is exactly equal to the incoming payload signal frequency plus a fixed overhead ratio (F-OHR). If the incoming payload signal frequency varies slightly, the digitally wrapped signal frequency will track that variation. In asynchronous mapping case, the digitally wrapped signal frequency is equal to the payload envelope frequency plus a fixed overhead ratio (F-OHR). The payload envelope frequency is generated by the wrapper and is not frequency locked to the incoming payload signal. The frequency difference between the payload envelope and the incoming payload signal is accommodated by the justification mechanism using the justification control (JC) information.

Reference is now made to FIG. 4 which illustrates a modified digital wrapper frame according to this invention. The G.709 frame structure is particularly modified here relative to the frequency justification bytes. Additional NJO-N bytes are added as well as additional PJO-M bytes and are placed here in row 4 at columns 15 to into the payload as indicated in FIG. 4. N and M can be any integer but here N is shown as equal to 2. It should be noted that this particular scheme for justification bytes is not absolute, as it is in the skill of one skilled in the art to place such justification bytes in other locations. The additional justification bytes are added to compensate for frequency differences between the payload rate (such as, for example, 9.953 Gbps in OC192) and what we called the effective payload rate (such as, for example, 9.957 Gbps in OC192), which is part of the invention set forth herein. More will be said about the effective payload rate later on. The number, M, for the PJO and the number, N, for NJO are a sufficient number of bytes to represent the required compensation for the frequency difference between the actual payload rate and the effective payload rate, the latter of which is dependent upon the effective payload type, i.e., the magnitude of the difference for OC192, for example, between the clock rate of the client payload signal of 9.953 Gbps and the effective payload signal of 9.957 Gbps. The magnitude of this difference in justification bytes is indicative of this frequency difference which can change from frame to frame since these different clocks can both vary ±20 ppm within the standard. More will be said about this later.

As shown in FIG. 5, a significant difference between the line side digital wrapper frame of this invention and a line side digital wrapper frame (ODU digital wrapper frame of G.709) of the type shown in FIG. 3 is that in FIG. 3, the 256 bytes of the FEC coding is distributed at the end of each of the respective rows 1-4 of the payload, as previously indicated. On the other hand, in the line side frame structure of this invention, the FEC coding, and also the OH if desired, is distributed along each row of the payload envelope. Thus, the payload is, therefore, divided into a plurality of payload groups. Each payload group is of a predetermined byte (column) width. In each payload group, the client signal payload is a predetermined byte width as well as the FEC-OH which also has a predetermined byte width, with all such byte widths being the same for each payload group making up the frame payload. The logic circuitry can then read out each payload frame knowing the start and stop point of each client signal payload and of each FEC-OH in each payload group. In reading out the payload bytes, for example, the FEC-OH bytes can be easily skipped along the readout of the payload. The number of payload groups in any frame payload may vary from one to several such groups. The upper limit is where the frequency of such groups in the payload may over burden the logic circuitry, for example. The reason for such a further and "finer" (as compared to "coarse" mentioned earlier in the description) distribution of the FEC code in the payload will become more evident later on, but it is suffice to say now that if the payload is to be read out of the frame with skipping of the FEC-OH sections to accommodate and render the logic circuitry less costly with minimum circuit latency. That is to say that the deployment of finer distribution of FEC, overhead (OH), if desired as well as stuffed bytes throughout the payload envelope permits a smaller size buffer in the logic circuitry because the latency of the buffer will correspondingly be smaller because of the stuff byte distribution.

Reference is now made to Table 1 below which sets forth examples of various known and standard client signal formats that are mapped to a client side transport frame, also hereinafter referred to herein as the iDTF transport frame. Table 1, inter alia, shows the fixed settings of the stuff bytes for NSB1 and NSB2 for respective client signal formats as well as the additional mapping requirements for NJO/PLO justifications to complete the client signal mapping to the client side frame at a predetermined and identical frame rate applied to all mapped client signals. Thus, it can be seen in Table 1 that the justification bytes, NJO/PJO, adjust for the frequency offset between the effective payload rate and the actual client signal payload rate whereas the NSB1 and NSB2 values in Table 1 provide the number of skipped or stuff bytes that need to be distributed over each client signal payload frame to adjust for the difference between the effective payload envelope size and the actual client signal payload envelope size according to the payload type. Thus, Table 1 indicates values, via NSB1 and NSB2, as to the number of stuff bytes (which also may be referred to as "unused" or "dummy" payload bytes) are required to be stuffed in each payload frame. Thus, it will be understood that the stuff bytes in each frame to achieve the effective payload envelope size is the same for all signal types, protocols or formats. This effective payload frame is one of two different frame formats utilized in the architecture of this invention relative to the transport of client signals placed or digitally wrapped into the two frame formats. Client signals are wrapped into a first frame format and are then transported from the client or customer side of the terminal node or network element to the line or carrier side of the same node or element where the wrapped client signals are further digitally wrapped into a second, faster frame format for transport on an optical medium. The faster frame format on the line side of signal transport is called the DTF frame format and the slower frame format on the client side of signal transport is called the iDTF frame format. "DTF" means Digital Transport Frame and "iDTF" means Internal Digital Transport Frame. "Internal" denotes within the network or system transceiver relative to the client side and the network element backplane which is before and separate from the line side of the same network element. However, as employed in this description as well as in the claims, reference to "DTF" will also be generically referred to as the line side transport frame or the "DTF frame", or "DTF transport frame", having a generic line side frame format and signal rate. Reference to "iDTF" will also be generically referred to as the client side transport frame or the "iDTF frame" or "iDTF transport frame" or the client side frame format and signal rate. While, the terms, "DTF frame" or "DTF transport frame" are somewhat redundant in that they literally mean "digital transport frame" or "digital transport frame transport frame" (the same being true for "iDTF frame" or "iDTF transport frame"), it will be understood by those skilled in this art as well as those reading this description that an example of client side transport frame is an "iDTF" and that an example of a line side transport frame is a "DTF".

While examples of these types of formats generally take on specific format configurations, they may easily have any other numerous configurations other than the particular formats for iDTF and DTF exemplified in this disclosure. For example, they may have different frame or signal rates as exemplified later in this description. Also, the frame content, the number of rows of the frame, the space utilized for overheard (OH), payload or FEC may be different so that this invention is not limited to the particular frame formats specified for DTF and iDTF disclosed here. A more important aspect of this invention is that the internal digital wrapping frame format includes insertion of fixed stuff bytes in the client side frame format, depending upon the client signal format or type (e.g., OC48, OC192, 10GE LAN Phy, 10G Fiber Channel, etc). Thus, depending on the particular client signal format employed, a predetermined number of stuff bytes are inserted in the digitally wrapped client signals so that the resultant line rate of these client side frames, after N client side frames are interleaved together (in standards, such as SONET and G.709, N=4) into a single line side frame for transport from node to node in the network. The client side frame rate and therefore, the line side frame rate will always be identical, i.e., the DTF frames will always be transported between network nodes at the same line rate, until the distal or far end of transport where N client side frames are retrieved from the line side frames, i.e., digitally unwrapped from the line side frame format and, thence, the stuff bytes are removed from the retrieved client side signals, the client clock rate being newly generated, and are provided to the client head end or client tributary. Thus, N number of client side frames are always of identical frame size and are then combined or interleaved together to form a line side frame of the same size as every other line side frame so that the line rate between any two network nodes or any other points of reach are always at the same line rate.

TABLE 1

Client Signal Mapping to iDTF Frame (Some Numbers Rounded Off to One Thousandth)

| Client Signal | Nominal Client Payload Rate | Encapsulated Payload Rate | Effective Payload Envelope | Effective Payload Rate | Rate Offset (ppm) | Max NJO | Min PJO | Max PJO | NSB1 | NSB2 |
|---|---|---|---|---|---|---|---|---|---|---|
| OC192 | 9.953 | 10.36 | 3660 | 9.957 | 409.206 | 0 | 4 | 8 | 8 | 28 |
| 10GE LAN | 10.312 | 10.36 | 3792 | 10.316 | 385.027 | 0 | 4 | 8 | 0 | 16 |
| 10GFC | 10.359 | 10.36 | 3808 | 10.36 | 60.332 | 2 | 0 | 4 | 0 | 0 |
| OC48 | 2.488 | 2.59 | 3660 | 2.489 | 409.206 | 0 | 4 | 8 | 8 | 28 |
| dual GE | 2.5 | 2.59 | 3678 | 2.501 | 632.353 | 0 | 6 | 12 | 8 | 10 |
| dual FC/2G FC | 2.125 | 2.59 | 3126 | 2.126 | 536.332 | 0 | 4 | 10 | 42 | 52 |

Reference is now made to FIG. 6 which illustrates another modified digital wrapper frame according to this invention. Note that FIG. 5 relates to the line side digital wrapper frame or DTF frame, which is a modified ODU digital wrapper frame of G.709, where the frame structure is utilized between node elements (NEs). In FIG. 6, on the other hand, is the client side digital wrapper frame or iDTF frame, which is a modified OPU digital wrapper frame of G.709 and is utilized in the client or tributary side in a client module, also referred to herein in the architecture here as the tributary access module or TAM. Also, the client side frames are employed in the backplane of intermediate network elements (NEs) where the same set of iDTF and DTF framers are deployed for remapping client signals having different Gbit rate signals. In the backplane and internal operation of the terminal or intermediate node, the client signals are handled at 2.5 Gbps, i.e., the minimal signal rate while signals with higher rates are dissected to the minimal signal rate, e.g., a 10 Gbps signal is quadrisected to four 2.5 Gbps signals. Thus, for example, 10 Gbit signals are basically quadrisected into four client signal frames or iDTF frames and these four frames are clocked out of the four framers into a new clock domain at the same clock rate. In the case of 2.5 Gbit signals, four such signals are wrapped into four iDTF frames into a new clock domain. It should be noted that if these quadrisected framed signals for 10 Gbit signals proceed from the client side TAM (tributary adaptor module) to the line side and into the DLM (digital line module) where N such frames are formed into a DTF frame, they may be a slight difference in phase among the several signals. This issue for 10 Gbit signals is avoided by a novel feature of this invention where the four framers are locked to be triggered at output at the same time according to one of the framers which functions as a master framer for this event. When ever the master framer circular buffer, e.g. a FIFO, is triggered to change its output pointer position, such as triggered for one justification event, then the other three framers, i.e., all four framers are triggered for the same event. Thus, in the case where larger Gbit rate signals are or, in the case of 10 Gbps signals quadrisected, the four framers are always processed the same way and the justification for the frames (i.e., iDTF frames) is always locked followed by a simple byte MUXing or DEMUXing, whatever the case may be. One framer FIFO in the group of framers is employed to decide the justification applied to all multi-sected or quadrisected signal sections. Thus, in this arrangement, subsequent interleaving of the multi-sected or quadrisected signal sections in preparation of line side framing (e.g., DTF framer and FEC encoding) can be accurately accomplished. As a result, the same framers in the IC logic circuitry can be employed for multiple rate client signals, for example, both 2.5 Gbit signals and 10 Gbit signals. It should be noted that this framer locking scheme is not employed for the lowest Gbit rate signals, e.g., 2.5 Gbit signals because these signals are not signal sections but rather four independent signals and it is not relevant that there is any phase difference between them at the distal or far end of their transport.

In the FIG. 6, the payload envelope of 3803 bytes is divided up into N payload groups with each such group having a payload section and a stuff byte (may also be referred to as a skipped byte or dummy byte) section. A payload group is further detailed in FIG. 6A. The number of stuff bytes to add with each payload section is determined from the client signal payload type and as referenced in the lookup table shown in Table 1, which is provided in the software or firmware associated with the logic circuitry in the ASIC chips at a node. There are two columns in Table 1 devoted to what are called nominally stuffed bytes (NSB) and there are two types of NSBs, NSB1 and NSB2. In these particular columns in Table 1, NSB1 sets forth the number of stuff bytes that are to be provided in N−1 payload groups of the frame and NSB2 sets forth the number of stuff bytes to be provided in the last payload group, N, which fundamentally comprises a remainder of the total stuff bytes to be stuffed into the payload envelope of the same frame. Thus, for N−1 groups, these payload groups will have the same number of stuffed bytes (the NSB1 value per N−1 payload group) while the last N payload group will have a remainder of stuff bytes (the NSB2 value) which payload group may be more than or less than the total number of stuff bytes (NSB1) in other N−1 payload groups. In some cases, it may be the only group with stuff bytes. For example, for OC192, the payload is 3808 bytes per row and the effective payload bytes for OC192 are 3660 bytes per row, a difference of 148 bytes, which is the total of stuff bytes required in a client side frame. Thus, the effective payload rate, due to stuff bytes, is 9.957 Gbps, which naturally is higher than the OC192 payload rate of 9.953 Gbps. As seen in Table 1, for OC192, NSB1 is 8 bytes for N−1 payload groups and NSB2 is 28 bytes for the N payload group. For OC192, N is equal to 16 so that in the first 15 payload groups, 8 bytes are stuffed in the stuff byte section of each of the payload groups 1-15 (a total of stuff bytes equal to 8×15 or 120) and for the last group, N, the N=16 payload group, 28 bytes are stuffed in this last N payload group, making a total of stuff bytes of 148 bytes (120+28), i.e., equal to the number total of stuff bytes previously mentioned above for OC192.

Note that the stuff bytes are placed in the iDTF frames so these frames will all have the same frame rate no matter what the bit rate is of the client signal. As a result, all digitally wrapped client signals, whether N independent signals of the lowest bit rate or multi-sected higher rate signals, all have the same frame rate. N of these identical bit rate iDTF frames are placed into a superframe or DTF frame so that the frame rate of the DTF frames also is always the same. As result, the line rate for transport is always the same no matter regardless of what the client signal format may be, such as a standard type or a proprietary (non-standard) type. In the example given above, that line rate is about 11.2 Gbps. Thus, through the utilization of this technique, the signal transport can support any kind of data format or protocol in each of the iDTF frames employing the stuff bytes to render, in each case, the frame rate of a single unchanged value. The value of the required number of stuff bytes for each type of client signal format are placed in a table having two values for each signal format, NSB1 and NSB2. The values of NSB1 plus NSB2 are the number of stuff bytes necessary in each iDTF frame to maintain a single predetermined frame size to achieve the resulting single unchanging frame rate. The NSB1 value is an integer value X which times n equals the first NSB1 value. The NSB2 value is any remainder value Y. So the algorithm for a given client signal stuff byte requirement (SBR) is:

$$SBR = X \times n + Y \qquad (1)$$

where X is an integer value and n is a multiple of that integer value to achieve the NSB1 value and Y is the NSB2 value. It is important for the reader to understand that there is no provision in the G.709 format to support four different and arbitrary time rates of OTU1 frame rates. The OTU1 frame rates must all be identical. The four OTU1 frame rates have to be at the same frequencies because the OTU2 must be exactly four times the OTU1 rate. If they are not at the same rates, then they cannot be MUXed into OTU2. Thus, to accommodate for different signal formats having different frame rates, different crystal local clocks are required to meet the frame rates of different signal formats or have at least a highly accurate clock divider. In this architecture, only one such highly accurate clock rate is needed since the iDTF frame rate for any signal format will always be the same or identical with the deployment of stuff bytes in the frame payload envelope.

So in summary, the scheme of the present invention basically maps any signal format or protocol into the iDTF payload envelope achieving in each case the same fixed iDTF frame rate. This fixed iDTF frame rate is matched to the predetermined DTF frame rate. The four iDTF frames are then mapped into the DTF frame. Thus, one simple flag is deployed to determine if the four frames are independent signals, such as STS48 signals, or a quadrisected STS192 signal to determine whether the four framers are locked to the same justification and NSB1 and NSB2 values to the same time domain for the case of the quadrisected STS192 signal or the framers are not locked to the same time domain in the case of four different STS48 signals. The principal advantage here is that different bandwidth signals (e.g., OC48 and OC 192) can be transported using the same system and circuit logic at no additional cost.

It will be understood by those skilled in the art that the stuff bytes according to their NSB1 and NSB2 values can be stuffed in other sections of the signal frame, other than the client payload, such as the signal overhead or in the FEC bytes. However, since the overhead section generally remains the same in the signals and the payload section changes in size according to different payload types, it is preferred to place the stuff bytes in the payload section of the frames to achieve the predetermined client side or iDTF frame size. By fixing the frame rate and frame size in this manner, additional overhead is not needed to indicate different frame rates and the line side frame and the processing module, particularly on the line side, can all be the same in every instance since it is not dependent in any way on the size of the signal payload or its type.

Thus, said another way, a predetermined number of payload column bytes are taken out of each payload envelope via byte stuffing thereby reducing the effective payload envelope size available for the client signal payload where the number bytes so removed is based upon the client signal payload type. The number of such bytes in effect removed from the payload is accomplished by designating such bytes as stuff bytes in the payload envelope. Then, the client signal payload is divided into N payload groups where each such group has a payload section and a stuff byte section. Such a reconditioned payload envelope is also called an effective payload envelope.

From the above description, it should be understood that the effective payload rate will always be higher than the particular client signal payload rate for a given payload type because of byte stuffing. These stuff bytes are ignored by the logic circuitry during readout of the payload from the client side frame. Therefore, there is always a difference in frequency or rate between the client signal payload rate and the effective payload rate. This frequency difference is kept track of via the NJO-N and PJO-M bytes in the payload frame illustrated in FIG. 4. As an example in Table 1 for OC192, it can be seen that this PJO positive adjustment difference is shown as a rate offset of ~409.206 in ppm as represented by bytes PJO-1 to PJO-M. Also, it should be understood that the width of the payload groups can vary depending upon either, or both, of how many bytes are to be included in the payload section of each payload group and how many bytes are to be included in the stuff byte section, which, as per Table 1, is dependent upon the effective payload type, such as for OC192 (3660 bytes), 10GE (3790 bytes) and OC48 (3660 bytes).

At this point, there may be realized an issue as to why the effective payload size and rate are a necessity since the client signal rate can be easily discerned from the PT byte overhead (See FIG. 4, col. 15, row 1) for any incoming client signal. The signal can then be clocked through the node at the actual payload rate. However, the essence of the network architecture disclosed is to operate all line sides of the network (i.e., the signal path propagation between network elements or nodes) at the same frequency or line rate. In order to do that for any client signal type or payload type for different protocols and standards, the overhead ratio (OHR) cannot remain fixed as in the case of the G.709 standard. Therefore, the present invention provides for a variable overhead ratio (V-OHR) that changes in accordance with the client signal payload type being received from the line side into a client side with the line rate always remaining a predetermined and fixed frequency or rate.

As an exemplary example of the digital wrapper frame structure of this architecture, the line side (DTF) signal rate may be 11.1 Gbps and the client side (iDTF) signal rate may be 2.612 Gbps. The DTF frame may be comprised of four rows of 16 columns of overhead (OH), 3808 columns of payload and 256 columns of FEC. The client side or iDTF frame may be comprised of four rows of 16 columns or bytes of overhead (OH), 380 bytes of payload, and 16 bytes of fixed stuff bytes and includes four rows if this format where N rows are interleaved for transport. The frame rate of an iDTF frame is one quarter of the frame rate of one DTF frame so that multiplexing or interleaving four iDTF frames into one DTF frame results in a constant line rate. The frame rate relative to these frames (four iDTF frames and one DTF frame) is identical although there may be differences in magnitude since the FEC overhead may be larger than the stuff bytes. A key point to realize, however, that the 16 bytes or columns of OH are repeated in the four iDTF frames interleaved in a DTF frame.

So, basically four iDTF frames are interleaved into one DTF frame. In this interleaving operation to form the DTF frame, the fixed stuff bytes are striped off and FEC is inserted in its place. As a specific example, the DTF frame rate may be designated 11.1 Gbps and is higher than four times the iDTF frame rate of 2.612 Gbps (i.e., higher than 10.448 Gbps) and higher than the standard rate for OC192 or 10 Gbps. This is because the FEC inserted in place of the fixed stuff bytes is larger in byte number than the 16 fixed stuff bytes. In other words, the higher rate of 11.1 Gbps is to accommodate for variations in the amount of FEC coding. It is also larger in order to accommodate the overhead of other standards, such as 10 Ge which has more columns or bytes of overhead. However, it should be realized that the DTF line rate of 11.1 Gbps does not change from NE to NE and can accommodate either FEC bytes or fixed stuff bytes. In the future, of course, if more FEC bytes were necessary, the line rate could be changed, but the goal is to maintain the same line rate from one network node or element to the next. It would be desirable to maintain the same line rate from NE to NE without ever changing the line rate in the future. This can be accomplished, for example, by dropping out some of the iDTF frame OH when multiplexed into a single DTF frame. Since the OH is substantially repeated in each iDTF frame without much change from frame to frame, some of that overhead can be eliminated for long lengths of time to accommodate more FEC code such as may be caused by a change in the type or kind of FEC encoding employed.

As indicated previously, the client side and line side frames of this invention are specifically referred to as the intra-node element digital transport frame or iDTF and the digital transfer frame or DTF, respectively. These proprietary frames permit the transfer, for example, from the client side or tributary side of the client egress point to the line side of a node element (NE). A node element (NE) may, for example, be at a transmitter node in a network, a receiver node in a network, an add/drop intermediate node of a network, a multi-way connection intermediate node of a network or a gain node of a network. In these proprietary formats, asynchronous mapping is also handled differently. An encapsulated payload envelope rate for 10 Gbps client signals is at 10.36 Gbps ±20 ppm. The 20 ppm frequency offset is determined by the local reference oscillator. The DTF signal rate is at 11.1 Gbps ±20 ppm. The frequency offset tracks the payload envelope rate offset. The payload signal can have different bit rates as long as it is below the constant payload envelope rate such as, for example, 10.36 Gbps. The nominal frequency difference between the fixed payload envelope and the payload signal is handled by fixed stuff bytes in the iDTF digital wrapper. For example, if the payload type is OC192, there are 148 fixed stuff bytes for every 3808 bytes in the payload envelope. The effective payload envelope rate is (3808−148)/3808*10.36=9.957353 Gbps. The frequency difference rate offset between this effective payload envelope rate and the nominal OC192 signal rate of 9.95328 Gbps is 409.206 ppm which will be accommodated by a justification mechanism. The ±20 ppm frequency offset of the actual OC 192 payload signal is also accommodated by the justification mechanism, the values of which are illustrated in Table 1, supra, for maximum NJO, minimum PJO and maximum PJO.

In another case, if the payload type is 10GbE LAN PHY, the nominal 10GbE rate is 10.3125 Gbps. There are 16 fixed stuff bytes for every 3808 bytes in the payload envelope. The effective payload envelope rate is (3808−16)/3803*10.36=10.316471 Gbps. The frequency difference or rate offset between this effective payload envelope rate and the nominal 10 GbE signal rate is 385.0 ppm which will be accommodated by a justification mechanism. The ±100 ppm frequency offset of the actual 10 GbE payload signal is also accommodated by the justification mechanism. The payload envelope rate and the DTF signal rate remain constant regardless of the client payload signal type.

A primary benefit of this asynchronous mapping approach is to eliminate the need of expensive PLL circuitry and crystal clocks in intermediate nodes in an optical transport or transmission network where the digitally wrapped client signals are regenerated. The payload signal can be asynchronously re-mapped into a new reference clock domain. This new clock domain is generated locally in a regeneration node intermediate of the network, such as an OEO REGEN node (See incorporated Publication No. U.S.003/0099018A1), and is without any jitter accumulated from preceding transmission path or optical span. When architecture is employed such that there is signal regeneration (OEO REGEN) at very node or other such site, the question of jitter accumulation invariably arises. This is because the frames of data “float” and they may be received at slightly different rates. In the past, this issue was solved by employing expensive PLL clock circuitry at all these sites to cleanup the signal. This not only expensive but also where there are different signal rates to be transported, there has to be different crystal clocks to generate accurate clocks for different signal rates. However, in this architecture, stuff byte values in the form of NSB1 and NSB2 values, such as, for example, for various signal formats illustrated in Table 1 are employed to cover different frequencies or line rates and different kinds of payloads. Thus, the DLM side does not need any expensive PLL clocks and the TAM or client receive side needs one crystal clock for multiple clock signals which are clock divided off the master crystal clock. This approach eliminates the problem of jitter accumulation and permits the use of less electronic components as well as cheaper clock components. For the higher rate signals, they are sectionalize, such as quadrisectized, and the signal sections are sent through client signal framers and clocked out at the same clock rate just prior to interleaving them into line side signal at a predetermined constant line rate which eliminates any frame justification issues and any justification accumulation problems On the other hand, in the case of a synchronously mapped signal, it has to be regenerated with the original clock domain and the expensive PLL circuitry is needed to control jitter accumulation at a regeneration node.

In the synchronous mapping case, the PLL circuitry has to run at exactly the frequency the digitally wrapped signal is running at. In conventional asynchronous mapping case, the local reference clock also has to run at the nominal frequency of the digitally wrapped signal according to each payload type. If the payload type is changed, the PLL or local reference oscillator frequency has to be changed. The clock and data recovery (CDR) circuit of the receiver also has to try to lock to different data rate when the payload type is changed. This complicates the hardware and software design when multiple payload types need to be supported in the same system.

Further discussion is now entertained relative to the determination of the effective payload rate or EPR. The effective payload envelope is smaller than the payload envelope size which is fixed by operating at a constant higher line rate or frequency such as, for example, 11.1 Gbps versus 10 Gbps. The bandwidth at the line frequency is too much to carry a payload type such as OC192 which has a smaller payload. In the case of OC192 client signals, as seen from Table 1, the effective payload size is 3660 columns per frame. So, in order to achieve the lower payload size and a corresponding lower effective payload rate as compared to the line rate, stuff bytes are inserted into the payload frame as depicted in FIG. 6. As previously indicated relative to FIG. 6, sections of such stuffed bytes are distributed along the payload and the amount of the stuffed bytes so distributed depends on the client signal payload type, such OC48, OC192 or 10GE, for example. In this sense, the size of the stuff bytes sections distributed along the payload will vary from one payload type to another payload type and the logic circuitry readout of the payload bytes is programmed, with the use of a frame column counter, to know where the a payload section is in each payload group between where a payload group begins and ends depending, of course, on the client signal payload type. These stuff byte sections of payload groups comprising the effective payload envelope are ignored by the logic circuitry when reading out the payload frames. The difference between the effective payload rate and the actual client signal payload rate is kept track of by means of the justification bytes (PJO-M) where M is an integer. The number of PJO-Ms utilized depends upon the magnitude of difference between the effective payload rate and the actual client signal payload rate. As an example, NJO-N may be N=−1 and PJO-M may be M=30 or more in order to have flexibility in generating different effective payload rates.

The effective payload rate (EPR) is equal to fixed line rate (LR) over the variable overhead ratio (V-OHR) or, $$EPR = \frac{LR}{OHR}. \tag{2}$$

The OHR may be determined as follows:

$$OHR = \frac{\text{Client Frame Size}}{\text{Client Payload Size} - \text{Payload Offset Size}}. \tag{3}$$

The effective payload clock is derived via the logic circuitry and a local reference clock, which need not and which is not a crystal oscillator. At the intermediate node, the payload type is derived from the incoming client signal payload type via the PT byte (FIG. 4, col. 5, row 1) and from Table 1, the client payload size as well as the offset size (NSB1 and NSB2) can be derived as well as the effective payload rate. The client signal is received at a node element (NE) at the line rate and is clocked through the node via the client payload rate which is derived from the OH via the justification bytes (PJO-M), which is the frequency difference between the effective payload rate, also from Table 1, and the known actual payload rate (k) or, $$\text{Client Payload Rate} = \text{Effective Payload Rate} + \text{Frequency Justification}(\text{PJO-}M) \tag{4}$$

As a specific example with reference again to Table 1, OC194 has a client signal rate of about 9.953 Gbps and an encapsulated payload rate of 10.36 Gbps. The line rate we have chosen, which is constant, is 11.1 Gbps, i.e., higher than the effective signal rate of about 9.957 Gbps, the nominal client signal rate of 9.953 Gbps. The V-OHR has to be variable in order to maintain a constant line rate of 11.1 Gbps. The effective payload rate determines the resultant OHR where the line rate is constant. So, as an example, according to formula (3) above, the client frame size for OC192 is 4080, the client payload size is 3808 for OC192 and the payload offset size from Table 1, where N is made equal to 16 is (NSB1+NSB2) or ((N−1)×8+28) or (15×8+28) which is equal to 148. The effective payload size is 3660 bytes for OC192 (see Table 1) which is client payload size of 3808 minus the offset of 148. Therefore, OHR is 4080 divided by 3660 or approximately 1.115.

It should be understood that, in essence, the effective payload rate is a mechanism by which the payload clock of 9.953 Gbps can be derived at a network node knowing the given constant line rate and the frequency justification bytes in parts per million (ppm) which are also indicated in Table 1 for different types of client signals. Since the effective payload size is a smaller number (or the effective payload rate is a higher rate), the stuff bytes are distributed along an OC192 client payload of 3808 bytes. Where N is made equal to 16 in the previously given example above, and as seen in FIG. 6, each payload group to N−1 would contain 238 payload bytes and 8 stuff bytes (NSB1) for a total of 246 payload group bytes. In the case of the last N payload group, which is payload number 16, this payload group would contain 238 payload bytes and 28 stuff bytes (NSB2) for a total of 266 bytes.

It will be understood by those skilled in the art that N can be made any number, starting with N=1, within reason, of course, because too many payload groups distributed within the client signal payload can be more of a burden rather than an aid in the utilization of this architecture. Alternatively, the payload groups could be of uneven or nonuniform size as long as the logic circuitry, through its counter, has knowledge of the byte positions or locations as to where each payload byte section in a frame payload group begins and ends and where the accompanying stuff byte section begins and ends relative to each payload group. Further, the distribution of the frame payload groups along the frame payload can be nonuniform, again, as long as the logic circuitry, through its counter, has knowledge of the byte positions or locations as to where each payload byte section in a frame payload group begins and ends and where the accompanying stuff byte section begins and ends relative to each payload group. Obviously, the easiest approach, from a logic circuit and circuit counter point of view, is to have payload groups uniformly distributed along the frame payload envelope.

Reference is now made to FIG. 7 which schematically shows a high level representation of an intermediate link node or network element (NE) 10. For purposes of simplicity, only client payload traffic from west to east is illustrated. However, in the normal situation, client payload traffic is bidirectional. As illustrated in FIG. 7, node 10 includes a digital line module (DLM) 12 to receive the client signal from the line side 11 for conversion from the optical domain into the electrical domain and the clock and data recovery circuit 16 where the line side client signals are recovered under the line clock rate via ASIC logic 15A. Also, FEC decoding is applied to retrieve an accurate electrical representation of the client signal. In this case, ASIC chip 15A provides for decoding the FEC and OH in the line side (DTF) frames (FIG. 5) of the client signal for use in recovery of the client payload envelope. The recovered line side frames proceed into signal processing unit 20A where the signals are received and processed via ASIC chip 17A, among other processing components, to recover the payload signal client side (iDTF) frames and generate the effective payload rate to recover the original client payload clock, such as with reference to the signal formats in Table 1, and the client signal justification bytes PJO-M to recover the frequency difference between the effective payload rate and the client signal payload rate. Also, since the line rate is faster than the client signal payload rate, a circular buffer must be employed in converting the client signal from the line rate to the client payload rate. Such a buffer, for example, may be a FIFO or a delay line. Shown here is the deployment of a FIFO 22A for this purpose. Processing unit 20A also include a local reference clock 21 from which the payload clock rate may be derived through the effective payload rate (EPR) and the deployment of a lookup table as previously explained.

As shown in FIG. 7, data at the faster line rate is clocked into FIFO 22A and clock out at the slower client payload rate (PL rate). Node element 10 is illustrated as an ADD/DROP node and the recovered client signal at its proper payload rate may be directed via lines 26 to client tributary 18, also in this embodiment may be included in the tributary access module (TAM) for forwarding to a client terminal via line 19 at the client signal rate. Node element 10 also provides for pass-through of client signals to processor unit 20B where the client signal, after having been regenerated (3R) at 20C, for example, is clocked through FIFO 22B from a lower backplane signal rate, e.g., 2.5 Gbps, back into a higher line rate, e.g., 11.1 Gbps, the client payload is reassembled with payload groups and stuff bytes to achieve the effective payload envelope (FIG. 6) via ASIC logic 17B and then passed onto DLM 14 where the line side envelope (FIG. 5) is generated via ASIC logic 15B so that the payload includes required FEC encoding and OH. Then, DLM 14 provides for conversion of the client signals from the electrical domain into the optical domain at the higher line rate and sent out on the east output line 13. By the same token, a client signal from client tributary 18 via lines 26 may be received by processing unit 20B where the proper client side signal frames (iDTF) and then the proper line side signal frames (DTF) are created via logic 17B and 15B and data in lookup Table 1 for the particular client signal payload envelope.

As previously indicated, an important feature of this invention over what has been previously done before is that the constant higher or faster line rate in the signal transmission network is independent of the client signal payload rate and also the input clock rate on the ingress side of a DLM at a node element. The output clock rate on the ingress side of a DLM at a node element will be changed employing a local reference clock 21 to the actual payload rate according to the particular client signal payload type making ingress at the node element to the backplane rate of operation. On the egress side of a DLM at a node element, the opposite rate change will be encountered.

The asynchronous network operation of the optical transmission network in this disclosure may also be utilized for transporting other types of client signal protocols. Other additional examples are provided in Table 1 beside OC 192. For example, 10GE protocol data in an asynchronous fashion by may be mapping or remapping in node element 10 into the modified G.709 frame structures of FIGS. 4-6. This asynchronous mapping and demapping allows the elimination of otherwise necessary and expensive clocking devices within these node elements (NEs), such as phase locked loop (PLL) controllers with crystal oscillators, thereby significantly reducing the overall costs in the manufacture of optical transmission networks, operating systems and their node elements (NEs).

It should be noted, as in the case of the OC192 payload, that since the Ethernet payload is also accommodated in accordance with this architecture, as shown in FIG. 4, the PJO-M bytes extend into the client payload such as into column 17 and 18, and beyond, in row 4, which are part of the client payload from column 17 to column 3824 of Ethernet payload envelope. While the scheme here includes opportunity bytes extending into the client payload, other possible configuration for stuff or skipped bytes in the Ethernet payload frame are readily ascertainable by those skilled in the art so that this architectural approach is not limited to the PJO-M extension necessarily into the client payload.

Reference is now made to FIG. 8 which illustrates at a node element such as may be found between end terminals or intermediate node elements (NEs). At these nodes, signal regeneration and FEC decoding and re-encoding are carried out at terminal points of each OTU path. Some optical amplifier (OA) nodes may be included in the link path but, for the most part, in any OTU path, there is not only signal regeneration but also signal error correction at an intermediate node. This architecture provides for both signal error correction at each node as well as signal regeneration at each node element while reducing system costs in a network that operates, in principal, as an optical transmission network that is inherently asynchronous.

In FIG. 8, a digital line module (DLM) is illustrated at the line side for receiving and sending serial optical data in the optical domain after passing through as parallel data in the electrical domain. Transmitter photonic integrated circuit (TxPIC) chip 32 provides for transmitting multiplexed optical channel signals as an optical output onto the line side optical medium and a receiver photonic integrated circuit (RxPIC) chip 34 provides for receiving multiplexed optical channel signals from the line side optical medium. Only two signal channels are illustrated for each PIC for the purposes of simplicity. However, more than two optical channels are generally present on each PIC, such as, for example, ten (10) optical transmitter signal channels integrated in TxPIC chip 32 and ten (10) receiver signal channels integrated in the RxPIC chip 34. TxPIC chip 32 and RxPIC chip 34, respectively, convert electrical channel signals into optical channel signals (EO conversion) and optical channel signals into electrical channel signals (OE conversion). A transmitter (TX) module in a DLM may include one or more transmitter photonic integrated circuit (TxPIC) chips 32 and the receiver (RX) module in a DLM may include one or more receiver photonic integrated circuit (RxPIC) chips 34. Thus, for example, there may be more than one 10-channel TxPIC chip 32, such as four such PIC chips to provide a 40 channel combined output. The multiplexed output from the respective chips may be multiplexed or interleaved together. Details of these PIC chips can be found in U.S. patent Publication Nos. U.S. 2003/0095737A1; U.S. 2004/009573A1; U.S. 2004/0033004A1; U.S. 2003/0095736A1; and U.S. 2003/0081878A1, which are based upon patent applications owned by the assignee herein and are incorporated herein by their reference. Thus, a digital line module or DLM, therefore, hosts channel signal bands in the TX and RX modules that contain one or more TxPIC and RxPIC chips. Not shown in FIG. 8 are associated control and stabilization circuitry for operating these PIC chips which are part of the TX and RX modules of a DLM. Before proceeding further, it will be realized that the practice of this invention is not based upon the utilization of PIC chips 32 and 34 so that this invention can be practice where the functional components on chips 32 and 34 are separate and, in part, wavelength tunable optical discrete components or devices, at least in part, as now principally used in optical transport or transmission equipment today.

The received serial optical data signal from RxPIC is a differential signal which is received by a 1:N serdes circuit 36, such as, for example, a SFI-4.2 FEC serdes circuit. The two 1:N FEC Serdes 36 and 38 shown in FIG. 8 include a standard interface defined by Optical Internetworking Forum (OIF), which is a 16-bit Low Voltage Differential Signaling (LVDS) interface. The function of serdes 36 and 38 is to deserialize the electrical channel signal into multiple parallel segments for easier signal handling via crosspoint switch 42 as well as to permit higher electrical signal transport latency and faster signal processing. As an example, the incoming electrical channel signal or signals from RxPIC chip 34 on the line side may be a 10 Gbps signal and is deserialized into four 2.5 Gbps signals at the serdes output on the parallel side as illustrated in FIG. 8 as 1:4.

The two serdes 36 and 38 in FIG. 8 are connected to crosspoint switch 42 which is connected to other line side, digital line modules or DLMs through backplane connector 44 and to TAMs 48 through midplane connector 46 with full data plane connectivity. As previously illustrated relative to FIG. 7, TAM(s) 48 are an interface to the client equipment or devices and applies proprietary encoding as required to the client signal for client reception. Each TAM 48 may be designed to handle multiple channels, such as two or more 2.5 Gbps channels or two or more 10 Gbps channels. More will be said about this later. Crosspoint switch 42 needs to support multiple channels with multiple data lanes in each channel. Crosspoint switch 42 is fully non-blocking. The line side traffic from RxPIC chip 34 can pass through one DLM to another DLM, which is also illustrated in principal in FIG. 10, where the client traffic is provided with signal egress to another optical network. This traffic can also be mapped into a different signal channel via wavelength interchange or conversion. Also, the line side traffic may also be directed to any port on the TAMs 48 for tributary add/drop functionality. At the client tributary interface, the client's original signal frequency is extracted from the signal digitally wrapped format so that the client's data signal will be at the appropriate signal rate for connection to the client's equipment. In this case, accurate clocking is necessary so that the TAM interface will include appropriate PLL circuitry with a crystal oscillator which, as previously indicated, is the only location in this architecture where a more expensive PLL circuitry with a crystal clock is required.

The 3R regeneration function at the line side shown in FIG. 8 is performed by the two SFI-4 FEC serdes 36 and 38. The RxPIC chip 34 provides an analog signal received waveform. The peak-to-peak swing of the analog waveform is fixed to a certain level by an automatic gain control (AGC) amplifier in the RxPIC module. The SFI-4 FEC serdes 36 and 38 have a built-in limiting amplifier (LA) which converts the received analog waveform to a saturated digital waveform.

FIG. 9 is block circuit diagram of a SFI-4 FEC serdes that may be employed with this invention. The receiver front end may have equalization capability which can compensate for frequency dependent loss induced by PCB traces. This is a useful feature when serdes 36 and 38 are some distance away from the RxPIC chips 34 in the RX module. FIG. 9 represents a more detailed block diagram of the content of the SFI-4.2 FEC serdes 36 or 38 in FIG. 8 which includes features of this architecture. These features are the deployment of FEC in the serdes and the mapping and demapping (remapping) of overhead (OH) and payload from a first clocking rate to a second clocking rate through the use of a free running clock 40 provided to serdes 36 and 38, as seen in FIG. 8. The approach of using a local reference clock for free running clocks in the serdes does not work unless there is mapping and demapping of the channel signal timing. This is because the internal clocks will not be running at the same frequency so that a mechanism must be deployed for insuring that no client traffic or payload is lost due to changes in clocking rates along a signal path.

With continued reference to FIG. 9, an incoming channel signal, for example, under a line side rate, such as 11.1 Gbps, undergoes clock and data recovery (CDR) at 37 to recover the constant line rate 11.1 Gbps clock and determine the effective payload rate via Table 1. This is followed by FEC decoding at FEC decoder 39. The FEC corrected client signal is then mapped into a signal which allows the client payload to be asynchronously mapped into an iDTF frame structure which means that there is a difference in frequency between the client payload signal and the effective payload rate. The effective payload rate is at a higher rate or frequency than the payload signal in order to provide additional bandwidth to run the overhead. However, the frequencies of these two signals continually varies so that it is necessary when deploying such a free running clock scheme to provide a mechanism by which underflow and overflow between the line side DTF digital wrapper frame and client side iDTF digital wrapper frame, for example, of the two different signals can be accommodated without losing data, in particular the client payload data. This mechanism is exemplified in FIG. 10 which is explained in more detail later. Thus, what is occurring is that the DTF frames, such as shown in FIG. 5, are being deinterleaved into iDTF frames in order that mapping and demapping of the signals at different clock rates can be accomplished in a manner as previously explained. The wrapping at the ingress and the dewrapping at the egress at each node element eliminates all phase noise or jitter (not just a portion of such jitter above the signal frequency), allows the elimination of the need of precision and costly PLL circuitry and crystal oscillators at a node element (NE) in the optical link, particularly at an intermediate node, allows FEC encoding and decoding at each node element in the optical link accurately and with lower throughput data errors, and accomplishes regeneration of the client signals. This is all accomplished with the elimination of any consideration or requirement for two crystal oscillators and PLL circuits at each node element to handle the transport of different types and formats of client signals.

As shown in FIG. 9, there are two reference clocks, RefClk A which is at the line rate or frequency and RefClk B which is at the payload rate both developed from local CLK 40 (FIG. 8) with the aid of discerning the effective payload rate in a manner as previously explained. Thus, there is a first higher clocking rate (e.g., 11.1 Gbps) for a wrapped client signal coming to the FEC serdes at the line side and a second lower clocking rate (e.g., 2.5 Gbps) for a wrapped client signal in parallel coming out of the FEC serdes at the parallel side. Alternatively, these two reference clocks could also be at substantially the same frequency and it may be more efficient if they are at the same frequency. With clock recovery and FEC decoding, the signal is dewrapped of its overhead at async demapper 41 and rewrapped in async mapper 45 in the client side frame (iDTF) format. This processing includes performance monitoring (PM) at 43. After remapping of the signal into the payload rate or frequency, the signal undergoes deserialization at SFI-4.2 Tx circuit 47, as known in the art. In the illustration here, the signal is shown to be segmented into four separated parallel signals at a rate, for example, of 2.5 Gbps, for further processing.

In the opposite direction for an outgoing signal to the line side, the signal from the parallel side is serialized at SFI-4.2 Rx circuit 49, and thence undergoes overhead and payload unwrapping at async demapper 50 and then rewrapping into a line side DTF format at async mapper 54 with intervening performance monitoring (PM) at 52. The newly rewrapped signal is then FEC encoded at FEC encoder 56 and clock to the TxPIC at, for example, at a line rate of 11.1 Gbps. The clocking rate at 11.1 Gbps, for example, is achieved through the use of a clock multiplying unit (CMU) 58 to multiply the frequency to the line side rate employing the local reference clock 40 (FIG. 8) as the single-base reference clock for the node.

It is important to note that the G.709 signal protocol, although it can operate asynchronously as previously explained, is not designed for retiming applications, i.e., it is not adapted for handling a payload signal in one time domain to pass through in a second time domain. In particular, the G.7090H protocol is not designed for changes in signal frequency. FIG. 10 discloses the mechanism by which, in the mappers and demappers of FIG. 9, changes in signal frequency are accommodated due to the deployment of free running clocks based from CLK 40 at a node element since the G.709 protocol, in particular the OPU overhead with its payload and the optical channel data unit (ODU) overhead, are designed to best accommodate synchronous operation.

FIG. 10 shows only a portion of the mapper/demapper of FIG. 9 and relates to asynchronous operation employing a circular buffer, here exemplified as a FIFO 60, to accommodate differences in incoming and outgoing signal frequency requirements of the FEC serdes. Further, FIG. 10 shows a back-to-back DLM scheme which is, in practice, the channel signal paths, for example, from the line side through the PICs 34 and 36, FEC serdes 36 and 38, crosspoint switch 42 and backplane connector 44 to another DLM as illustrated in FIG. 8.

In FIG. 10, CPUs 69 of the respective DLM modules operates the signal processing unit 61 under the management of a software program which software also includes the data for Table 1. Such software can be frequently updated to include the Table 1 information for additional or changed client signal payload types. Units 61 include electronic processing circuitry in the form of ASIC chips. From line side east or west, an optical signal or signals are received in RX unit 62 of the DLMs which, in the representation here, includes RxPIC chip(s) 34, CDR circuit 37 and the FEC units 36 and 38. The signal is then received by the RX OH processor 64 in the async demapper where the signal or signals are remapped into a client side payload frame structure or iDTF frames which has different signal timing (client signal payload rate) from the original line rate signal timing of the line side frame structure or DTF frames as explained previously. These differences in timing are accommodated by using circular buffers 60A and 60B, which may be, for example, a 64 byte or 256 byte FIFO circuit with adjustable pointers. Alternatively, buffer 60 may be a delay line, for example. At this point, the stuff bytes are removed from the client signal payload. The buffer provides a way of keeping track in the timing difference of the client signal on the receiving side at the RX OH processor 64 (line side) versus the other side of buffer 60B at the TX OH processor 66 (client side) where the clocking rate will be the payload rate of the particular client signal or at the backplane rate of the signal processing system at a node element, such as, for example, 2.5 Gbps. Iterations of the payload bytes are written into the buffer by a write (W) pointer 63 by the RX OH processor 64 while the iterations of the same payload bytes are read out of the buffer via a read (R) pointer 65 by the TX OH processor 66. At this point in time, the channel signal is in a different time domain, i.e., the payload rate time domain, and is further processed via deserialization (serial to parallel) and signal processing as provided to the crosspoint switch (XP) 68 for, in this case, distribution to another DLM having the same configuration. At the second DLM, the channel signal is handed off to the RX OH processor 70 and the payload bytes are remapped, i.e., restuffed with stuff bytes, buffered at FIFO 60B and then converted into the effective payload envelope for line handling at the line rate, e.g., 11.1 Gbps, at TX OH processor 72. The line rate signal is then passed to TX unit 74 for conversion from the electrical domain into the optical domain for transport on a fiber transmission link.

As previously mentioned, a further important feature is that the distributing of the FEC encoding through the client signal payload in the line side frame and the client side frame as illustrated in FIG. 5 which has the advantage of permitting the use of smaller capacity FIFOs 60A and 60B since the distributed FEC as well as stuff bytes can respectively be ignored by the circuit logic of the FIFO circuits 60.

The asynchronous processing is the same in the case of demapping and mapping for signal transmission from each of the back-to-back DLMs via TxPIC chip(s) at TX modules 74. Thus, the back-to-back DLMs of FIG. 10 represent an optical-to-electrical-to-optical (OEO) signal regenerators, or OEO REGENs as set forth in patent Pub. No. U.S. 2003/0099018A1, supra, between both the electrical and optical domains and provide two different timing domains for the electrical domain signals in order that the line side rate through the network may remain fixed at a higher frequency rate. In this connection, each of the processors 64, 66, 72 and 77 in FIG. 10 may have their own free running clocks based from local CLK 40 or may share a free running clock in a particular signal time domain.

In the use of circular buffers to provide for asynchronous timing between different clocking frequencies, it should be realized that, in certain instances, the write (W) or read (R) pointer of a particular buffer may overtake one another. Where the ingress clock rate is faster than the egress clock rate, the write (W) pointer will periodically "lap" the read pointer, resulting in a buffer overflow condition. When this happens, client signal data received, but not yet transmitted, will be overwritten resulting in data loss on every signal frame and message corruption on aligned composite signals. Where the egress clock rate is faster than the ingress clock rate, the read (R) pointer will periodically "lap" the write pointer, resulting in a buffer underflow condition. When this happens, the data received and already transmitted will then be retransmitted, resulting in the duplication of every-frame signals and message corruption on aligned composite signals. In these situations, one iteration of the overhead sequence in the buffer is ignored and the buffer is set to operate on a new iteration of the overhead sequence. This is of no consequence or loss to the read side TX OH processor because the OH data comprise multiple, repeated iterations of almost always the same OH data, i.e., this OH data in the modified client side envelope (iDTF OH) and the modified line side envelope (DTF OH) changes very slowly so that the loss of one or more iterations of the overhead will have no detrimental consequence on the asynchronous exchange in the overhead and its accompanying client payload.

With respect to the foregoing discussion, there are two requirements that should be met. The first requirement is that all of the line side single-frame signals must be integrated or "debounced" by the RX unit so that an occasional duplicate or missing byte in an every frame signal does not have an adverse impact. Particular attention is to be paid to signals which trigger an alarm based on a single data value, where an overflow can result in a false negative detection and an underflow can result in a false positive detection. The second requirement is that the RX unit be able to gracefully handle the periodic mangling of the message content due to buffer overflow and underflow conditions at the TX side in aligned messages.

Thus, to client signal equipment, external to the optical transport or transmission network disclosed herein, the signal digital wrapping and dewrapping of this architecture will appear as completely transparent. By providing asynchronous mapping services, the client signal is through-timed, which eliminates the need for complex network synchronization schemes. SONET add/drop modules, for example, would provide the SONET section and the line side termination functions for a client signal, which would appear to be directly inter-connected to client signals.

In summary, then, within each node element, as illustrated in FIG. 10, the incoming OCh signal is received and terminated at the RX unit 62. The OCh is converted to an electrical signal carrying the digital wrapper frame. The line side or DTF frames and their overhead signals are terminated on the ingress DLM. Correctable bit errors detected in the line side or DTF frames are recovered via FEC decoding. Client side or iDTF frames are then generated and passed across the backplane 68. The egress DLM processes the internal frames, generates new line side (DTF) frames, including FEC encoding, and passes the electrical signal to the TX unit 74 where new OCh signals are generated and transmitted.

Thus, in the RX and TX units 62 and 74 of FIG. 10, each of the FEC/serdes circuits of FIG. 9 are asynchronous with respect to each other, as are the ingress and egress DLMs. As a result, there are three independent (plesiochronous) timing domains, two of which are identical in timing, for a signal passing through such an OEO REGEN (optical-electrical-optical regenerator) site.

An interim summary is now made as to the functionality of the digital optical network approach disclosed in terms of the line side module and client or tributary side module which also accommodate a plurality of different signal formats such as, for example (but not limited to), OC3, OC 12, OC40, OC48 (STS48), STM16, OC192 (STS192), STM64, 2×GigE, 10 GigE LAN Phy, 10G Fiber channel and so on. The signal transport format employed in this architecture is universal in the sense that any client signal, whether having a publicly known signal format or a proprietary signal format, may be transported by the digital optical network without any need of redesign or upgrade of the legacy or installed network except for changes to the line side transport card. The universal nature of the digital transport system of this invention can accommodate TDM traffic as well as WDM traffic or data-oriented traffic, such as packet traffic including Ethernet. The unique approach of the architecture calls for a digital hierarchy which includes encapsulating or mapping client signal frames, such as, for example, 2.5 Gbit signals or 10 Gbit signals, into a universal transport frame for line side signal transport which has been referred to herein as a digital transport frame or DTF. The DTF functions as an envelope or carrier of the client payload signal and permits the digital optical network architecture to perform additional functions such signal switching, management and 3R functionality. Moreover, the DTF transport frame can concurrently accommodate different client signal formats having different signal rates with different formats as exemplified above. Because the DTF transport frame is universal relative to any client signal, as presently known or developed in the future, the implemented digital optical network can accommodate future or emerging client signal formats and/or service requirements. Importantly, as will be further exemplified in later discussion, the line rate of the DTF frame is universally the same everywhere in the network so that the line side rates from terminal nodes to any intermediate network elements and to other terminal nodes remain the same.

As is known to those familiar with network architecture, present and next-generation WDM network systems are typically oriented to support TDM traffic. The implementation of different signal formats, such as 2.5 Gbit and 10 Gbit, are restrictive in the sense that the transport of these different formats is designed specifically for the signal format to be transported. Some approaches support direct mapping of such different signal formats into native wavelength optical signals which yields less than optimal spectrum utilization and requires consideration of different optical engineering rules. Also, if asynchronous interfaces are utilized, the engineering of intermediate span signal regeneration to perform 3R functionality becomes complex, which becomes increasingly more important as the signal reach of the network system is increased.

Other network approaches provide for TDM MUXing of lower rate signal interfaces or portions (e.g., 2.5 Gbit) into a 10 Gbit wavelength signal prior to signal transport. The typical approach is to multiplex 4×OC48/STN16 signal portions into an OC192/SYM64. However, this approach lacks signal transparency and ability to groom transported signals.

In the synchronous SONET format, there is a similar multiplexing approach of multiplexing four OC48 (2.5 Gbps) frames into one OC192 (10 Gbps frame or OTU frame). However, the frames to be combined need to all be aligned and the frame rates need to be identical in order to multiplex the OC48 frames into one OC192 frame. While some leeway is permitted as measured in parts per million, e.g., ±4.6 ppm for STS48 protocol, what is required is a local clock to control the framer. The framer is actually a mapper and demapper of the signals. In the case of the present architecture, each of the client side signals or portions of such signals in a given time domain are mapped into a client side frame having a new clock domain using a FIFO for mapping the payload. The array of framers are in an ASIC IC chip and are for mapping and demapping signal payload from one time domain into another time domain generated via a local clock to form N parallel signals in a new client side signal format all in the same time domain so that the N signals can be mapped into client side frames or iDTF frames. In particular, a respective framer decodes a respective iDTF frame and places the signal payload into a respective FIFO. Thus, there are several FIFOs each with read/write pointers where the write pointers are independent of other FIFO write pointers to accommodate client signals coming from client tributaries which may be at slightly different signal rates. The overhead (OH) of the signals is copied into the other side of the clock domain and this overhead is also mapped into the new client side frames. In using the FIFO, the FIFO has an input pointer and an output pointer. When payload signals are read out of the FIFO, the output pointer reads out the signal data from the FIFO in a new time domain rate which is the same for all N framers or iDTF frames. In other words, the client signals are wrapped into a new format in a new and common clock domain and their frame boundaries will be aligned. In remapping from the client domain into an iDTF frame, some of the overhead in some of the frames may be lost, but this is not client signal overhead but it overhead of the client side frame format which changes slowly over time so that loss of some of this overhead is inconsequential. The several retimed signals are then byte interleaved via a byte interleaver in a round robin fashion, that is, a byte of signal data, is taken from each framer sequential on a continuous basis. The interleaved signal is then provided to a DTF framer which includes a FEC encoder which framer functions to modify a few of the bytes in the combined signal overhead and inserts the FEC code in the interleaved signal. The FEC encoding includes encoding of both the signal payload and its overhead. The FEC encoder can be separate and downstream from the DTF framer where the framer leaves the FEC bytes in the signal at zero and the FEC encoder inserts the FEC bytes into the signal at the appropriate locations. In any case, the IC circuit logic knows the signal timing and the points for insertion of FEC code into an interleaved iDTF-based DTF frame.

With respect to the foregoing, if the client side frame has a lower frame rate compared to the incoming client signal, then some of the overhead for the client side frames may be dropped. But, as indicated above, this is not detrimental since the overhead changes slowly over time and basically will be the same from frame to frame. If the client side frame has a faster frame rate compared to the incoming client signal, then the overhead may be merely replicated. Thus, while some of the client side overhead in wrapping client signals into a new time domain may be lost, the signal payload of the client signals will not be lost in spite of FIFO read/write pointer changes and will always be transported to the distal or far end, i.e., its final destination point.

Also, as previously indicated, in the G.709 format, a digital wrapper is created where one STS48 signal is mapped into OTU1 frames and then four OTU1 frames are mapped into one OTU2 frame, which is roughly 10 Gbit or approximately 10.7 Gbit, and the OTU2 frame is transported over the link or span. Also, in the G.709 format, a STS192 signal is mapped directly into an OTU2 frame. However, the G.709 framer format does support the mapping of one STS48 signals into OTU1 frames of all the same size, independent of the client signal payload rate through the deployment of stuff bytes, and then mapping a plurality of such OTU1 frames into one OTU2 frame. The G.709 process is more complex using different logic for different Gbit rate signals, multi-secting (such as quadrisecting of 10 Gbps signals) is not supported, and frame locking is not a conceived notion. The present architecture differs from this approach in that two different sets of framers where one set utilizes a first framer to map the STS192 signal into N first iDTF frames and, thence, N iDTF frames are mapped into one DTF frame in a second framer and the other set utilizes a first framer to map four STS48 signals into four iDTF frames and, thence, N iDTF frames are mapped into one DTF frame in a second framer. Thus, the STS192 10 Gbit signal is quadrisected into four 2.5 Gbit parts so that all 10 Gbit signals as well as 2.5 Gbit signals are operating in the backplane interface of the node element along four parallel paths operating at 2.5 Gbps within the iDTF format. In the case of a quadrisected 10 Gbit signal, the signal is reassembled out of the backplane into a STS192 signal and thence into an OC 192 signal. Thus, an ASIC IC chip can deploy the same set of framers to operate on an STS48 signal or an STS192 signal.

Also, another distinction of this architecture is that, compared to the G.709 format, only one overhead in the iDTF/DTF frame scheme is needed, i.e., one layer of overhead for the iDTF frames is necessary and a second layer of overhead is not deployed in the DTF frame when MUXing or otherwise interleaving together multiple iDTF frames as is the case for G.709 format where a second layer of overhead is created for the OTU2 frame.

As can be viewed from U.S. patent application Ser. No. 10/267,212 and Pub. No. U.S. 2003/0099018A1, supra, the universal transport frame approach of this architecture permits easy population of OEO REGENs anywhere in the network without having to design a new intermediate node element from the beginning.

The digital hierarchy, beside including a universal signal transport frame or DTF explained above, also includes a plurality of multiplexed or interleaved internal digital transport frames or iDTF, encapsulating the client signal, which are together, as a group of N such frames are then digitally wrapped into a DTF transport frame for transport in a network. Thus, there are N-iDTF frames that are wrapped into a single DTF envelope. In the present explanation, N is chosen as equal to four (but can be any other integer) because this is the same scaling factor employed in G.709 through digital wrapping of four (4) OTU1 frames into a single OTU2 frame, as previously explained. A key feature of the architecture here is a two-layer digital transport hierarchy that permits signal handing, performance monitoring and signal grooming no matter the client payload type or rate. A line side module or a digital line module (DLM) supports the universal DTF transport frame which runs substantially at the same clock rate everywhere in the network, for example, at 10.8 Gbps, 11 Gbps or 11.1 Gbps, and is appended with high-gain FEC. The iDTF transport frames associated directly with the client or tributary signal are in the client side module which has also been referred to as the tributary adaptor module or TAM. In particular, the N iDTF transport framers in the client side module can be a lower Gbit rate public signal format which can either take signals in that lower Gbit rate signal format, or deserialize, partition or multi-sected (e.g., quadrisected) higher Gbit signal rate signals into that lower Gbit rate signal format, asynchronously and then pass them onto the DTF framer in the line side module. An example of the foregoing lower Gbit rate signal is client signals comprising 2.5 Gbit types, such as STS48, STN16 and 2×GigE multiplexed signals which are directly mapped into the iDTF, whereas client 10 Gbit signals are deserialized or partitioned into four parallel lanes and then passed on to the DTF framer in the line side module. Unlike current WDM or DWDM network systems today, this client signal encapsulation asynchronous multiplexing/demultiplexing and universal line side transport rate provide for full client signal transparency over any distance of the digital optical network.

Lastly, the fact that digital framers are employed to wrap and de-wrap client signals having the same frame size, such as iDTF frames, permits not only their transport at the same line rate via a line side frame, such as the DTF frame, but also opens the door to a "plug and play" kind of architecture where line side modules or TAMs may be easily inserted in a client side of a terminal node element or and add/drop intermediate node element to meet new proprietary or different standard client signal formats or protocols without the necessity of redesigning or reconstructing the node element or adding new line side DLM components to the network element. If new DLM components need to be added to handle the new capacity, then these DLM components can also be added as an addition at the node element as well. However, their addition is not always necessary where new TAM components are added to the node element. This has particular utility at an intermediate node element where new TAMs may be inserted in the node element to meet client signal demand occurring in proximity to the node element without redesigning or reconstructing the intermediate node element, unless it entails the replacement of an optical amplifier node element in which case new OEO REGEN network element is installed in place of or as a bypass of the amplifier.

As indicated above, the universal digital wrapper frames of this invention placed in such node elements can handle any existing or proprietary client signal formats. This is more particularly illustrated in connection with FIG. 11 which shows the general architecture for the digital optical network terminal network element (NE) for the transmission or reception of client signals. It is substantially similar in architecture to the illustration in FIG. 8 where two DLMs are connected back-to-back via the backplane as well as interfaced to a plurality of TAMs 48 as shown in that figure. The client side of the node includes the TAMs 82(1) to 82(N) which receive client signals in the same or different signal format or protocol from client equipment 80(1) to 80(N). Each TAM 82 may be configured to receive one signal format or multiple signal formats as will be illustrated later in connection with FIGS. 14 and 15. Each TAM 82 is a circuit board module which from a group of such modules is designed to receive different client signal formats. For example, a TAM card 82 may be designed to handle 2.5 Gbit signals or 10 Gbit signals of a particular protocol, such as 10 GE LAN Phy, OC192 or 10G Fiber Channel. Thus, depending upon a client's signal format requirement, a particular TAM 82 is installed to handle those signals of the client. The TAMs 82, therefore, function like plug-in card modules or "plug and play" modules which are selected from inventory to meet the customer's need based upon the signal format adopted by the client including proprietary signal formats personal to the client.

With reference again to FIG. 11, the line side includes digital line modules or DLMs 84(1) to (84(N) which are of the same design and house the DTF framer. The DTF framer utilizes DTF frames where each DTF frame digitally wraps or encapsulates N iDTF frames. The DLMs 84 can all be substantially the same since the client signals are wrapped within identical iDTF frames and the DTF frames are all the same length so that the line speed or rate is identical relative to all DLMs 84. As shown in FIG. 11, several TAMs 82 of the same or different client signals of different signal format or protocol may be connected via several different signal-type TAMs 82 on the client side and those different TAMs 82 are connected to the universal DLMs 84. In this connection, it is possible, therefore, for one DLM to handle more than one TAM since the client side iDTF frames are all the same size no matter if the TAMs are handling the same signal rate (e.g., multiple 2.5 Gb signals) or different signal rates (e.g., one or more 2.5 Gb signals and one or more 10 Gb signals). As previously referenced generally, DLMs 84 include optical transmitters and optical receivers in communication with signal band multiplexing/demultiplexing module or BMM 86. BMM 86 optically combines the bands of signals from DLMs 84, which are WDM signals, for transmission over optical link 88. By the same token, banded optical signals received from link 88 are demultiplexed into separate signal bands via BMM 86 and coupled to DLMs 84 where the signals bands are demultiplexed into plural signals comprising different wavelength channel signals.

At this point, relative to FIG. 11, it should be readily seen that the terminal network elements as well as other node or network elements in the digital optical network are modularized in that a series of client side cards and a line side card. Also, a different client side card may be easily selected for deployment for interface with client (customer) equipment matching the client signal format, whether a public signal protocol or a proprietary signal protocol. Such selected client side can be deployed with one or more universal line side card(s) (in the DLM), all which all have the same line rate and made possible by the deployment of the client side framing having iDTF transport frames with stuff byte locations, the total amount of stuff bytes across an N-set of such frames being dependent upon the client signal payload type and signal rate so that the iDTF transport frames are all of substantially the same payload size.

Reference is now made to FIG. 12 which illustrates architecture for an intermediate node element in a digital optical network. This node element may be, for example, for re-amplification of the client signals, signal regeneration (OEO REGEN), 3R signal care or signal grooming. As seen in FIG. 12, the architecture of FIG. 11 carries over to FIG. 12 in that the client equipment 93(1) to 93(N) is coupled to a corresponding client side TAM 92(1) to 92(N) on the client side, which TAMs are then coupled to a line side DLM 90(1) to 90(N) for connection to a west-bound line 95 via band multiplexer module or BMM 94 or an east-bound link 97 via band multiplexer module or BMM 96. Thus, DLMs 90 can either handle pass-through signals or add/drop signals via their connected TAMs 92 for tributary distribution to appropriate client equipment indicated at 93.

Reference is now made to FIG. 13 which illustrates a cross-connect and add/drop node element 100 for a digital optical network comprising two west BMMs 106A and 106B and two east BMMs 107A and 107B for the banding and unbanding of WDM signal banded groups and coupled to a group of back-to-back DLMs 102 and 104, 103 and 105 where the signals are received and sent in their DTF universal frame format. It should be noted that additional DLM pairs may be coupled in parallel to DLM pairs 102 and 104, 103 and 105, such as indicated at 111, to handle additional WDM signal bands of wavelength signals from corresponding BMMs 106 and 107. Also, in this embodiment, as well as in the embodiment of FIG. 12, additional functionality may be included in DLMs 84, 102, 103, 104 and 105, such as 3R functionality and signal grooming. Thus, while not shown here in detail in this application, these DLMs may further include corresponding TAMs to retrieve from the signal second transport or iDTF frames, the signal first transport or DTF frames and reassembled from the first transport frames the client signals for 3R functionality after which they are rewrapped in the iDTF and thence thereafter the DTF frame formats. This processing would include apparatus similar to that shown and described in FIGS. 14 and 15 to be discussed later.

In the node element of FIG. 13, BMM group 106A, 107A and BMM group 106B, 107B are different traffic network systems from one another and it may be necessary for traffic from one such system to be transferred to the other. As just previously indicated, in such a cross-connect, a larger number of such DLMs may be installed depending upon traffic demand. Connected to each of these DLMs, shown for DLMs 103 and 104, are a plurality of client signal cross connection line 106X to cross connect such traffic. Also, the client side tributaries or TAMs 108(1) . . . 108(N) in each case are connected to the customer's or client's equipment as indicated at 109(1) . . . 109(N). To be noted is that there is more than one client connection to each TAM 108 so that more than one client signal having the same signal format is received by a single TAM 108. Thus, for example, a single TAM 108(1) may be designed to receive one type of signal format, such as the STS48 format, and another TAM 108(N) may be designed to receive another type of signal format, such as the STS192 format, both of which are for wrapping or dewrapping from and to the client side employing stuff byte wrapper to achieve iDTF transport frames. As previously indicated, these TAM cards are capable of sending or receiving any standard or proprietary client signal format and respectively wrapping or dewrapping the signals in the iDTF transport frame format. Also, as shown in FIG. 13, at least two such DLMs 103 and 104 in different systems are cross-connected to one another via lines 106 so that signals originating from one network system may be transferred or received by another network system at the same intermediate node element.

Reference is now made to FIG. 14 which is a more detailed illustration of an end terminal node element 110 relative to the transmission of optical signals from the client side to the line side of such a node element. In node element 110, as shown, only transmit side is illustrated for purposes of simplicity. The receive side is illustrated in FIG. 15 which will be discussed next. In FIG. 14, a plurality of TAMI/DLM units 112(1) . . . 112(N) are shown coupled to band multiplexer module or BMM 114 via optical lines 113(1) . . . 113(N). As indicated in previous embodiments, the multiplexed output signals from optical units 112 are optically multiplexed or interleaved at BMM 114 as bands of multiplexed signals for transport on optical link 115. Details of one TAM/DLM unit 112(N) illustrates a plurality of TAMs 116A and 116B where client signals, if received as optical signals, are OE converted by OE converter 118 to electrical signals comprising OE converters 119A and 119B, respectively, in TAM units 116A and 116B. It should be noted at this point that client signal can also be received as electrical signals in which case there is no need for OE conversion and are, therefore, sent to their respective frames 120A or 120B after any necessary signal processing, TAM 116A is adapted for reception of N/n Gbit signal (e.g., a 10 Gbit quadrisected signal (10/4)) whereas TAM 116B is adapted for reception of n×N Gbit signals (e.g., n×2.5 Gbit signals). Note that, for the convenience of the reader, dotted lines 110A and 110B mark the boundaries for the digital wrapping of the client signals of either type of signal rate into the client side transport frame format or iDTF transport frames. In other words, between these boundaries, the client signals are appropriately provide with stuff bytes and digitally wrapped into iDTF transport frame format. This formatting is carried out by framers 120A in 10G TAM 116A and framer 120B in n×2.5 G TAM 116B which, as shown here, are 10 Gbit signals quadrisected into iDTF transport frames relative to framers 120A and into independent 2.5 Gbit signals into iDTF transport frames relative to framer 120B. It should be noted that the high rate (10 Gbps) signals are quadrisected into four partitioned signal sections for propagation along a four lane connection to switch fabric 123 while the lower rate or 2.5 Gbps signals are independently processed via framer 124, FEC encoder 126 and EO converter 127. Framers 120 can be and generally are part of the serdes/deserdes ASIC chip. The wrapped or mapped signals are then received into switch fabric 123 as part of DLM 122 where the iDTF frames are digitally wrapped or mapped into line transport side or DTF transport frames via framers 124(1) . . . 124(N) in a manner as previously explained. Next, the FEC encoding is added to the DTF frames at FEC encoders 126(1) . . . 126(N) in the manner as previously indicated. Then, these electrical signals are EO converted into corresponding optical signals for transport as indicated at EO converter 127. While such conversion can be accomplished via discrete semiconductor or electro-optic devices, as known and used conventionally in the optical network industry today, a monolithic TxPIC 128 having multiple signal channels is shown as employed for this EO conversion. Chip 128 is disclosed in U.S. patent application, Pub. No. U.S. 2004/009573A1, supra, and comprises N integrated signal channels where each channel includes a laser source 139 (L) and a modulator (M), the outputs of which are coupled to an integrated optical combiner 134, such as an arrayed waveguide grating (AWG), where the optically modulated signals, $\lambda_1$ to $\lambda_n$, are combined or multiplexed and then coupled, as multiplexed, to BMM 114 via line 113(N). It should be reiterated that additional TAMs 119 can be added to network element 110 for connection to the switch fabric 123 of DLM 122 to meet new and ever increasing traffic demands of client signal-connected customers.

Reference is now made to FIG. 15 which is a mode detailed illustration of end terminal node element 140 relative to the reception of optical signals from the line side to the client side of such a node element according to this invention. In node element 140, as shown, only the receive side is illustrated for purposes of simplicity, as the transmit side has been previously discussed relative to FIG. 14. In FIG. 15, banded WDM signals are received on optical link 145 and disbanded by BMM 144 and the disbanded WDM signal groups of multiplexed optical signals are received by respective DLM/TAM units 142(1) . . . 142(N) via optical lines 143(10 . . . 143(N), respectively, and are first provided to a respective DLM 154. The signals are first OE converted by OE converter 127 in DLM 154(N) where the received signal is received in RxPIC 158 having a decombiner 144 for decombining or demultiplexing the signal into N optical signals, $\lambda_1$ to $\lambda_n$, and then electrically converted via an array of on-chip photodetectors 153. Details of chip 152 are disclosed in US patent application Pub. No. U.S. 2004/0033004A1, supra. The chip 152 may include chip-integrated electrical signal processing, such as, circuitry for conversion of the detected current signals into voltage signals and signal amplification which integrated chip portion is indicated at 155. The electrically converted signals are then FEC decoded at 156(1) . . . 156(N), and then undergo demapping from the client side or DTF frames via framers 154(1) . . . 154(N) into client side or iDTF frames. At this point, the electrically represented signals are n×N Gbit signals (e.g., 2.5 Gbit signals) or quadrisected N/n Gbit signals (10 Gbit signals), as the case may be, and passed through switch fabric 153 to appropriate framers 150A or 150B in TAMs 146A (10 Gbit) and 146B (2.5 Gbit), respectively. At framers 150, the signals are demapped from the client side or iDTF frames and reassembled into original client signals where they may be then converted into the optical domain via EO converters 149A and 149B for seamless reception by client equipment. Framers 150 can be and generally are part of the serdes/deserdes ASIC chip. It can be seen that the client side or iDTF frames are in process for the most part between the dotted lines 140A and 140B, i.e., between the midpoint of framers 150 and 154. It is in this phase that all signals are at the lowest iDTF frame rate, such as, for example, may be 2.5 Gbps. Note that, in the case here, that the quadrisected high bit rate (10 Gbit) signals are reassemble from four partitioned signal sections into a complete signal at framers 150A while the separated lower rate (2.5 Gbit) signals are independently presented to EO converters 149B for conversion into the optical domain. It is noted that the timing or retiming of these signals can be an issue with frame jitter being an issue particularly when reassembling quadrisected high rate (e.g., 10 Gbit) signals. This issue is taken up in later discussion.

Reference is now made to FIGS. 16-21 which deal more directly with the timing between time domains in the system architecture illustrating the DLM and TAM architecture for asynchronous clocking the client signal payload from one time domain into another time domain. FIG. 16 illustrates in more detail the line side or DLM transmit side of the asynchronous timing architecture. DLM 160 receives from the customer system interface or TAMs, four client signals or a multi-sected client signal on signal channels 161(1) . . . 161 (4) in their iDTF transport frame format from the iDTF framer and are provided to the iDTF overhead processors 162(1) . . . 162(4) where just the iDTF frame overhead is defined relative to the iDTF frames within which the signals have been previously digitally wrapped. These digitally wrapped signals may be in a clock domain of the respective clocks, CLK $t_1$, CLK $t_2$, CLK $t_3$, and CLK $t_4$. Then, the iDTF frame signals are provided respectively to a demapper/mappers 164(1) . . . 164(4) at their respective clock rates where N-iDTF transport frames are digitally wrapped into a single DTF transport frame and retimed to a new clock, $t_5$, which is the same for all four demappers/mappers 164. Typically, units 162 and 164 may be referred to, together, as the DTF framer. These four signal channels may have their own separate and independent signal rates so their clock rate is extracted from the overhead. Their different timing rates are represented by the different recovered clocks, CLK $t_1$, CLK $t_2$, CLK $t_3$ and CLK $t_4$, which clocks may be provided from a single node reference clock (such as clock 40 shown in FIG. 8) based upon their recovered clocks at demappers/mappers 164 where the signal payloads are then retimed, as iDTF frame-wrapped signals, from their first time domain ($t_1$, $t_2$, $t_3$ and $t_4$) into a second common time domain ($t_5$) within the DTF transport frame-format. Thus, the $t_5$ clock is used to remap the signal payload into the DTF transport frame. With the aid of the demapper/mapper buffer, such as a FIFO, the client signals are reframed into a new time domain having a universal line frequency or rate as previously explained, e.g., the line rate 11.1 Gbps. The four formed DTF frames are then byte interleaved at interleaver 166 after which the DTF frame overhead is inserted by DTF OH processor 168 followed by FEC encoding and insertion in the FEC section of the interleaved DTF frames via FEC encoder 169.

An important feature of the DLM transmit side framer is that the four demappers/mappers 164 can be locked, via locker 167, to satisfying justification requirements. For example, if the four channels comprise four independent client signals, there is no need to lock the four units 164 and the signals are timed to the same $t_5$ clock from their respective clocks, CLK $t_1$, CLK $t_2$, CLK $t_3$ and CLK $t_4$. However, a justification issue arises when the four signals on channels 161 are a quadrisected client signal, such as a partitioned 10 Gbit signal. In this case, the locker 167 flag is activated or set to lock all units 164 to the justification requirements of one of the units, such as demappers/mappers 164(1), so that timing of all channels will be identical and the portioned signal can be properly reassembled at the distal receive end of signal transmission.

FIG. 17 is a more detailed view of the line side or DLM receive side of the timing architecture. The incoming signal on the link is received by DLM 170 and is first FEC decoded at FEC decoder 178 followed by removal of certain parts of the DTF overhead at DTF OH processor 179. This is followed by deinterleaving of the four DTF frame signals or signal partitions which are then sent onto respective demapper/mapper units 174(1) . . . 174(4). Units 174 have a recovered clock which we refer to as clock $t_6$ since the $t_5$ clock is locally generated at the transmit side (FIG. 16) and so these $t_6$ clocks may be different from the $t_5$ clock. The $t_7$ clock is the local reference clock on this DLM 170 for clocking out the output from the four units 174. At the demapper/mapper units 174, the demapper extracts the signal payload which is translated through the unit FIFO where it is remapped to the $t_7$ clock into new iDTF fames. It should be understood, and is mentioned again, that the iDTF frame format is the interface format within the node elements of this architecture. The iDTF fames are then processed in iDTF OH processors 172(1) . . . 172(4) to provide the client signals on system interface channels 171(1) . . . 171(4). Again, a locker 177 is utilized on units 174 to lock their operation to the justification of one of the units 174, via a received flag, when the deinterleaved signals at deinterleaver 176 are a client multi-sected signal so that the justification is all the same when the signal is integrated together.

Reference is now made to FIG. 18 which illustrates a specific example for 10 Gbit mode TAM operation in the receive direction. In TAM 180, the iDTF framed data from a corresponding TAM is provided on the four channels 181 (1) . . . 181(4) to iDTF OH processors 182(1) . . . 182(4) which extract some of the iDTF overhead together with a stuff byte check and parity check. Some of the iDTF frame overhead remains. At demappers 184(1) . . . 184(4), the stuff bytes are removed and the payload clock, $t_{10}$, is extracted. This $t_{10}$ clock is basically the same for either the 10 Gbit mode or the 2.5 Gbit mode with some clock correction. Next, the payload is extracted from the iDTF frames and inserted into the FIFO buffer at the $t_{10}$ clock rate and removed from the buffer at the $t_{11}$ clock rate which is the client signal payload envelope clock in a manner that has been previously described. The $t_{11}$ clock is generated by a precision PLL circuit clock which is the only such crystal clock needed in the network architecture. Also, since this embodiment is a 10 Gbit mode at the TAM 180, the locker 187 receives a flag to set or lock all four demappers together for identical justification so that the jitter justification byte(s) (PJO-M) are applied to all quadrisected parts of the client 10 Gbit signal. The client signal which is retimed to the client signal payload envelope rate clock, $t_{11}$, is deinterleaved at byte interleaver 186 to reassemble the client payload as originated at the distal end at the transmit terminal network element where the signal originated. Next, the reassembled signal is checked by the client PM or payload monitor 188 to determine any procedural errors in the payload, after which the signal is sent on to the client equipment.

Reference is now made to FIG. 19 which comprises TAM 200 for preparation of the transmission of a client 10 Gbit mode signal for forwarding to a line side framer at a DLM. As shown in FIG. 19, the 10 Gbit mode client signal is received on channel 209 which may generally be in optical domain format. The signal is treated at the client PM or performance monitor 208 to check for signal errors. The signal is then divided or byte deinterleaved into four lanes or channels, which is also referred to here as being quadrisected since there are N lanes. Then, in the case here, each channel payload at mappers 204(1) . . . 204(4) is wrapped or loaded into iDTF frames and mapped to a single local reference clock, $t_9$, with no PLL circuitry required. Also, the required numbers of stuff bytes are added to the payload in a manner as previously discussed in connection with Table 1, supra. It should be noted that the slower the signal payload rate, the more stuff bytes that must be added to the payload to achieve the same iDTF frame size for different client signals. This is why there are more stuff bytes, for example, for 2.5 Gbit mode signals than the 10 Gbit mode signals. Thus, the $t_9$ clock is the same for all signal channels and the locker 207 has its flag set to lock for justification applied to all mappers 204 to the same justification byte(s) so that all four channels have the same signal timing. The stuff bytes are added to the signal payload at mappers 204 making all of the channel signals of the same length so that when N-iDTF frames (N equal four here but can be another integer) are inserted and interleaved into a single DTF frame on a repeated basis, there will result the same universal line rate between respective network elements in the optical transmission network. Also, it should be noted that the $t_8$ clock is the payload clock of the signal client and, depending upon the signal type, this recovered clock could be different from each another. In the case here, for example, this recovered clock can be the $t_7$ clock in FIG. 17. After signal mapping into the iDTF payload frames, the iDTF frame overhead is added at iDTF OH processors 202(1) . . . 202(4) and sent on to a corresponding DLM via the four channels or lanes 210(1) . . . 201(4).

Reference is now made to FIG. 20 which illustrates a TAM 190 in the receive direction for the recovery of 2.5 Gbit mode client signals in the iDTF frame format emanating from a corresponding DLM. It should be noted that the four channels 191 may contain client signals from four different DLMs having different reference clocks, which are shown here as clocks, CLK $t_{10-1}$, CLK $t_{10-2}$, CLK $t_{10-3}$ and CLK $t_{10-4}$. The four lanes 191(1) . . . 191(4) of iDTF transport frames are then passed to the four iDTF OH processors 192(1) . . . 192(4) where a portion of the iDTF overhead is removed from the frames after which the 2.5 signal payloads are received at demappers 194(1) . . . 194(4) where clock recovery is achieved from the signals as represented by clocks, $t_{10-1}$, $t_{10-2}$, $t_{10-3}$ and $t_{10-4}$. These clocks are generated at the corresponding DLM and are respectively recovered from the signals. The $t_{10}$ clocks may be identical for the 2.5 Gbit mode and the 10 Gbit mode. The client payload is extracted from the iDTF frames via demappers 194. The $t_{10}$ clocks can be at different clock rates since there four independent 2.5 Gbit signals or even other proprietary signal rates such as, for example, at 2.1 Gbps. These four signals are then clock out of demappers 194 via their FIFO buffers at clock rates, $t_{11-1}$, $t_{11-2}$, $t_{11-3}$ and $t_{11-14}$, which are all different clock rates because the clock rates may not be exactly the same. Again, this clock or clocks are a precision clock with PLL circuitry and the only one required in the architecture of this invention which includes the use of justification bytes to get to the real client signal clock. The signals then at the client payload rate are passed to client PM circuits 198(1) . . . 198(4) where performance monitoring is accomplished to check for errors and thence onto the client's equipment. Note that in this scenario, no flag is applied to locker 197 since there are four independent 2.56 Gb signals.

Reference is now made to FIG. 21 comprising TAM 210 in the transmit direction for receiving four different client signals on the four channels 211(1) . . . 211(4) from client equipment and are passed onto client PM or performance monitor 212(1) . . . 212(4) to check for signal errors. Then, the four independent signals are passed onto mappers 214(1) . . . 214(4) where the client signal clocks, $t_{8-1}$, $t_{8-2}$, $t_{8-3}$ and $t_{8-4}$, are recovered. These respective clock rates can be all at slightly different clock rates since they are independent client signals at 2.5 Gbps. Then, the signal payloads are wrapped with an iDTF frame and stuff bytes are appropriately added to each such frame, via the NSB1 and NSB2 values from Table 1, so that the clock rate at the output of the mapper FIFO buffers is at the same frame clock rate, $t_9$, which is a simple local reference clock like reference clock 40. The iDTF wrapped signals are then provide with iDTF overhead at iDTF OH processors 216(1) . . . 216(4) and thereafter passed on to one or more corresponding DLMs. Note that in this scenario, no flag is applied to locker 217 since there are four independent 2.56 Gb signals.

It will be understood by those skilled in this art that the TAMs 180, 190, 202 and 210 can be supplied as separate client signal access modules and used as "off-the-self" modules from inventory of the equipment manufacturer for handling different client signals having different client signal payloads and rates. Such TAMs can be fabricated for new client signals having non-standard or proprietary payload types, such, for example, 2.3 Gbps, where new values for NSB1 and NSB2 are added to Table 1, supra, relative to each such a new TAM module to meet the stuff byte requirement of the new client signal payload type as well as change the local clock rate to provide a match to the new payload type. So the architecture can easily support any frequency in a readily expeditious manner with little TAM modification as long as the bit rate of the signal is below the payload envelope rate, e.g., 2.59 Gbps or 10.36 Gbps for the 2.5 Gbit mode and the 10 Gbit mode, respectively.

It should be understood that the signal processing of the 10 Gbit mode and 2.5 Gbit mode in the receive direction, as explained relative to FIGS. 18 and 20, as well as in the transmit direction, as explained relative to FIGS. 19 and 21, may be in the same ASIC chip circuitry utilized for each of these modes.

As a final summary, in reading and understanding the foregoing disclosure of this invention, it will be realized by those skilled in this art that, among various features of this invention, two predominate features of this invention are (1) a single channel rate for transport of all signals between network elements (NEs) and end terminal elements and (2) the digitally wrapping of different payloads of different client signals into N client side transport frames using stuff bytes to render each frame size equal to a predetermined value and then the N frames are wrapped into a line side frame for transport in the network. The N client side transport framers may have the lowest signal payload rate, are deployed to digitally wrap N client signals or a multi-sected client signal into N parts or partitions for signals having higher payload bit rates. In the case of multi-sected signals, the N framers are locked together and justification is imposed by one of the framers on all of the framers because the client signal has been sectionalized. In this case, the frame rate of the N framers may be lowest signal payload rate so that N times the lowest signal payload rate is basically the signal rate of the sectionalized signal payload rate. However, independent client signals at the lowest signal payload rate are not locked for justification since they may be operating independently either at slightly different frame rates or totally different frame rates. Thus, independent justification is imposed upon each N framer. A basic example of the foregoing is four framers that accept four independent 2.5 Gbps signals for digital wrapping where the framer justification is unlocked and one 10 Gbps signal that is sectionalized (quadrisected) into four subsections for the four framers where the framer justification is locked since these framers contain parts of one original client signal. In the case of multi-framer locking for justification, such as in the case of a 10 Gbit signal, justification for one client side frame (iDTF frame) is identical for each of the other client side frames when the sectionalized signal parts are clocked all to the same clock rate via the framer FIFOs. Otherwise, additional overhead would be needed for independent justification for each sectionalized signal part so that the separate parts can later be recombined to provide the original client signal. With more overhead to process, more circuit logic is necessary to process the overhead and justification. By deploying the locking scheme of this invention, the sectionalized signal parts are always aligned and, therefore, that additional overhead is not required or necessary. In the case of multi-framer non-locking to achieve independent justification applied to each framer, the four independent signals may be mapped to the same clock domain using FIFOs. However, the justification bytes may be all different because the signal frames, being for independent signals, will not necessarily have all the same clock rates. Any relative delay in or latency among the framers among the several signals is not material or relevant because at some point along the network span, the signals will become independently separated in any case.

While the invention has been described in conjunction with several specific embodiments, it is evident to those skilled in the art that many further alternatives, modifications and variations will be readily envisioned and apparent in light of the foregoing description for performing the intended functions to achieve the results and advantages set forth in this application and such modifications and variations are deemed to be within the scope of this invention. As one example, while more complex and costly, it is within the scope of the disclosed architecture to add an additional layer overhead to the line side frame, as is the case in the G.709 standard, so that the 10 Gbit signals can be wrapped directly into the client side frame, in the same manner of wrapping to an OTU2 frame, using the new layer of overhead to resynchronize these signal frames at the distal end of transmission. This is done without requiring these signals to be sectionalized and without deploying the concept of locking multiple framers together for signal justification followed by byte interleaving. Also, it will be recognized that the principals of the disclosed architecture are also applicable to the transport of electrical communication signals transported purely in the electrical domain of telecommunication networks and not in the electrical-to-optical (EO) and optical-to-electrical (OE) exchange type utilized in optical telecommunication networks. Thus, the invention described herein is intended to embrace all such alternatives, modifications, applications and variations as may fall within the spirit and scope of the appended claims. Also, those skilled in the art would readily appreciate that all described parameters, dimensions, material and configurations are meant to be exemplary and will depend specifically on the particular applications to which the invention is to be applied or employed. Also, any combination of two or more features, systems, apparatus, materials and/or methods, where their combination are not mutually inconsistent, is included within the scope of this invention. Transitional words or phases that include words, such as, “comprising”, “including”, “carrying”, “having”, “containing” and the like are to be interpreted as open-ended, e.g., to mean “including but not limited to”.

What is claimed is:

1. A network element comprising:

an input configured to receive client data having a payload rate; and an output configured to supply a plurality of first frames within a second frame, each of the plurality of first frames having a payload envelope configured to accept at least four payload groups, each of the at least four payload groups including a payload section and a stuff byte section, the payload section of each of the at least four payload groups including data indicative of a portion of said client data, the stuff byte section of each of the at least four payload groups including a plurality of stuff bytes, the at least four payload groups distributed along an entire length of the payload envelope of each of the plurality of first frames such that the stuff byte section of each of the at least four payload groups is located at a respective one of a plurality of positions along the entire length of the payload envelope of each of the plurality of first frames, the payload section of a respective one of the at least four payload groups being provided between successive ones of the plurality of positions, wherein the stuff byte section of one of the at least four payload groups has a first total number of stuff bytes and each of the stuff byte sections of remaining ones the at least four payload groups has a second total number of stuff bytes, the first total number of stuff bytes being different than the second total number of stuff bytes, wherein the second frame has a substantially constant data line rate, wherein each of the plurality of first frames further includes an overhead section, the overhead section includes a first value indicative of the first total number of stuff bytes and a second value indicative of the second total number of stuff bytes.

2. The network element of claim 1, wherein each of the plurality of first frames have the same length.

3. The network element of claim 2, wherein the plurality of first frames is a first plurality of first frames, the second frame is a first of a plurality of second frames, the client data is a first client data, the data is first data, and the payload rate of the client data is a first payload rate, the output of the network element further being configured to supply a second plurality of first frames within a second of the plurality of second frames, the second plurality of first frames including second data indicative of a second client data received by the input, the second client data having a second payload rate different than the first payload rate, and the second of the plurality of second frames having the substantially constant data line rate.

4. The network element of claim 1 wherein the first and second total numbers of stuff bytes are indicative of the payload rate of the client data.

5. The network element of claim 1, wherein the payload rate is a one of a plurality of payload rates, the substantially constant data line rate of the second frame being equal to said one of the plurality of payload rates multiplied by one of a plurality of variable overhead ratio values, each of the plurality of variable overhead ratio values corresponding to a respective one of the plurality of payload rates.

6. The network element of claim 1, further comprising a buffer circuit configured to convert the client data between a first clock domain associated with the plurality of first frames and a second clock domain associated with the second frame.

7. The network element of claim 6, wherein the buffer circuit comprises a circular buffer.

8. The network element of claim 6, wherein the buffer circuit comprises a FIFO.

9. The network element of claim 1, further comprising a buffer circuit configured to convert the client data between a client signal clock domain associated with the client signal and a first clock domain associated with the plurality of first frames.

10. The network element of claim 9, wherein the buffer circuit comprises a circular buffer.

11. The network element of claim 9 wherein, the buffer circuit comprises a FIFO.

12. The network element of claim 9 wherein, the buffer circuit comprises a FIFO.

13. A network element, comprising:

an input configured to receive client data having a payload rate; and an output configured to supply a plurality of first frames within a second frame, each of the plurality of first frames having a payload envelope configured to accept at least four payload groups, each of the at least four payload groups including a payload section and a stuff byte section, the payload section of each of the at least four payload groups including data indicative of a portion of said client data, the stuff byte section of each of the at least four payload groups including a plurality of stuff bytes, the at least four payload groups distributed along an entire length of the payload envelope of each of the plurality of first frames such that the stuff byte section of each of the at least four payload groups is located at a respective one of a plurality of positions along the entire length of the payload envelope of each of the plurality of first frames, the payload section of a respective one of the at least four payload groups being provided between successive ones of the plurality of positions, wherein the stuff byte section of one of the at least four payload groups has a first total number of stuff bytes and each of the stuff byte sections of remaining ones the at least four payload groups has a second total number of stuff bytes, the first total number of stuff bytes being different than the second total number of stuff bytes, wherein the second frame has a substantially constant data line rate, wherein the payload rate is one of a plurality of payload rates, the first total number of stuff bytes is one of a first plurality of total numbers of stuff bytes, and the second total number of stuff bytes is one of a second plurality of total numbers of stuff bytes, the network element further comprising a memory circuit configured to store the plurality of payload rates and the first and second pluralities of total numbers of stuff bytes.

14. The network element of claim 13, wherein each of the plurality of first frames has the same length.

15. The network element of claim 14, wherein the plurality of first frames is a first plurality of first frames, the second frame is a first of a plurality of second frames, the client data is a first client data, the data is first data, and the payload rate of the client data is a first payload rate, the output of the network element further being configured to supply a second plurality of first frames within a second of the plurality of second frames, the second plurality of first frames including second data indicative of a second client data received by the input, the second client data having a second payload rate different than the first payload rate, and the second of the plurality of second frames having the substantially constant data line rate.

16. The network element of claim 13 wherein the first and second total numbers of stuff bytes are indicative of the payload rate of the client data.

17. The network element of claim 13, wherein the payload rate is a one of a plurality of payload rates, the substantially constant data line rate of the second frame being equal to said one of the plurality of payload rates multiplied by one of a plurality of variable overhead ratio values, each of the plurality of variable overhead ratio values corresponding to a respective one of the plurality of payload rates.

18. The network element of claim 13, further comprising a buffer circuit configured to convert the client data between a first clock domain associated with the plurality of first frames and a second clock domain associated with the second frame.

19. The network element of claim 18, wherein the buffer circuit comprises a circular buffer.

20. The network element of claim 18, wherein the buffer circuit comprises a FIFO.

21. The network element of claim 13, further comprising a buffer circuit configured to convert the client data between a client signal clock domain associated with the client signal and a first clock domain associated with the plurality of first frames.

22. The network element of claim 21, wherein the buffer circuit comprises a circular buffer.

* * * * *